US010855115B2

(12) United States Patent
Mercier et al.

(10) Patent No.: US 10,855,115 B2
(45) Date of Patent: Dec. 1, 2020

(54) WIRELESS POWER TRANSFER DEVICE AND METHOD WITH DUAL-FREQUENCY OPERATION

(71) Applicants: Patrick Mercier, San Diego, CA (US); Dukju Ahn, Daejeon (KR)

(72) Inventors: Patrick Mercier, San Diego, CA (US); Dukju Ahn, Daejeon (KR)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 15/742,199

(22) PCT Filed: Jul. 7, 2016

(86) PCT No.: PCT/US2016/041331
§ 371 (c)(1),
(2) Date: Jan. 5, 2018

(87) PCT Pub. No.: WO2017/007932
PCT Pub. Date: Jan. 12, 2017

(65) Prior Publication Data
US 2018/0198322 A1    Jul. 12, 2018

Related U.S. Application Data

(60) Provisional application No. 62/190,005, filed on Jul. 8, 2015.

(51) Int. Cl.
*H02J 50/40* (2016.01)
*H02J 50/12* (2016.01)
(Continued)

(52) U.S. Cl.
CPC .............. *H02J 50/40* (2016.02); *H01F 27/34* (2013.01); *H01F 27/38* (2013.01); *H01F 38/14* (2013.01);
(Continued)

(58) Field of Classification Search
CPC .. H02J 50/40; H02J 50/70; H02J 7/025; H02J 50/12; H01F 27/34; H01F 27/38; H01F 38/14; H01F 2027/348; H04B 5/0037
(Continued)

(56) References Cited

U.S. PATENT DOCUMENTS

| 7,202,768 B1 | 4/2007 | Harvey et al. | |
| 2004/0121738 A1* | 6/2004 | Ide | H04B 1/30 |
| | | | 455/82 |

(Continued)

OTHER PUBLICATIONS

Blaine R Copenheaver, International Search Report for Application No. PCT/US2016/041331, dated Nov. 16, 2016.

(Continued)

*Primary Examiner* — Rexford N Barnie
*Assistant Examiner* — Thai H Tran
(74) *Attorney, Agent, or Firm* — Greer, Burns & Crain, Ltd.; Steven P. Fallon

(57) ABSTRACT

A method and device for wireless power transfer provide the ability for concurrent power transfer on two widely separated bands. A wireless power transmitting device includes two coils respectively configured for transmission at two separate wireless power transmission frequencies. A dedicated current or voltage driver is provided for each of said two coils. A controller causes the current or voltage drivers to selectively or concurrently generate an AC magnetic field at either of the frequencies or both frequencies. A method includes concurrently driving two coils arranged with respect to each other to reduce losses at two separate wireless power transmission frequencies while suppressing eddy currents in the path of one of the two coils.

7 Claims, 19 Drawing Sheets

(51) Int. Cl.
*H01F 38/14* (2006.01)
*H01F 27/34* (2006.01)
*H02J 50/70* (2016.01)
*H02J 7/02* (2016.01)
*H01F 27/38* (2006.01)
*H04B 5/00* (2006.01)

(52) U.S. Cl.
CPC .............. *H02J 7/025* (2013.01); *H02J 50/12* (2016.02); *H02J 50/70* (2016.02); *H01F 2027/348* (2013.01); *H04B 5/0037* (2013.01)

(58) Field of Classification Search
USPC .......................................... 307/104; 320/108
See application file for complete search history.

(56) References Cited

U.S. PATENT DOCUMENTS

| | | |
|---|---|---|
| 2007/0145830 A1 | 6/2007 | Lee et al. |
| 2008/0071313 A1 | 3/2008 | Stevenson et al. |
| 2011/0285210 A1 | 11/2011 | Lemmens et al. |
| 2012/0235636 A1 | 9/2012 | Partovi |
| 2012/0256719 A1 | 10/2012 | Shudarek et al. |
| 2013/0043734 A1 | 2/2013 | Stone et al. |
| 2013/0049484 A1 | 2/2013 | Weissentern et al. |
| 2014/0125140 A1 | 5/2014 | Widmer et al. |
| 2014/0354069 A1 | 12/2014 | Jung |
| 2015/0115878 A1 | 4/2015 | Park |
| 2015/0318710 A1* | 11/2015 | Lee .......... H02J 5/005 307/104 |
| 2016/0012966 A1* | 1/2016 | Davis ......... H01F 38/14 307/104 |
| 2016/0056639 A1* | 2/2016 | Mao .......... H02J 50/80 307/104 |
| 2016/0322849 A1* | 11/2016 | Yeh .......... H01Q 7/00 |
| 2017/0033610 A1* | 2/2017 | Borin .......... H01F 27/365 |

OTHER PUBLICATIONS

Dukju Ahn and Songcheol Hong, "Effect of Coupling Between Multiple Transmitters or Multiple Receivers on Wireless Power Transfer", IEEE Transactions on Industrial Electronics, vol. 60, No. 7, Jul. 2013.

Dukju Ahn and Songcheol Hong, "Wireless Power Transfer Resonance Coupling Amplification by Load-Modulation Switching Controller", IEEE Transactions on Industrial Electronics, vol. 62, No. 2, Feb. 2015.

Marco Dionigi and Mauro Mongiardo, "A Novel Resonator for Simultaneous Wireless Power Transfer and Near Field Magnetic Communications", Proceedings of IEEE International Microwave Symposium, pp. 1-3, 2012.

Maysam Ghovanloo and Suresh Atluri, "A Wide-Band Power-Efficient Inductive Wireless Link for Implantable Microelectronic Devices Using Multiple Carriers", IEEE Transactions on Circuits and Systems-I: Regular Papers, vol. 54, No. 10, Oct. 2007.

Ming-Lung Kung and Ken-Huang Lin, "Enhanced Analysis and Design Method of Dual-Band Coil Module for Near-Field Wireless Power Transfer Systems", IEEE Transactions on Microwave Theory and Techniques, vol. 63, No. 3, Mar. 2015.

Patrick P. Mercier and Anantha P. Chandrakasan, "Rapid Wireless Capacitor Charging Using a Multi-Tapped Inductively-Coupled Secondary Coil", IEEE Transactions on Circuits and Systems-I: Regular Papers, vol. 60, No. 9, Sep. 2013.

Zeljko Pantic et al., "Multifrequency Inductive Power Transfer", IEEE Transactions on Power Electronics, vol. 29, No. 11, Nov. 2014.

Patrick S. Riehl et al., "Wireless Power Systems for Mobile Devices Supporting Inductive and Resonant Operating Modes", IEEE Transactions on Microwave Theory and Techniques, vol. 63, No. 3, Mar. 2015.

* cited by examiner

WIRELESS POWER TRANSFER DEVICE AND METHOD WITH DUAL-FREQUENCY OPERATION

This application claims priority under 35 U.S.C. § 119 and all applicable statues and treaties from prior U.S. provisional application No. 62/190,005, which was filed on Jul. 8, 2015.

FIELD

A field of the invention is power transfer. Example applications of the invention include to wireless charging devices, to charge devices such as mobile phones, tablets, laptops, watches, etc. without a hard wired connection to the device.

BACKGROUND

Wireless power transfer is trending as a desired feature, with many manufacturers offering devices to transfer wireless power. In addition to device manufacturers, public service businesses, furniture makers and others are showing interest in installing wireless charging stations. Unfortunately, separate charging devices are required for different types of devices. There are presently three charging standards backed by alliances knows as the Alliance for Wireless Power (AW4P), the Qi—Wireless Power Consortium (WPC), and the Power Matters Alliance (PMA). The latter two use inductive power transfer, while the first uses magnetic resonance.

The operating frequency of each standard unfortunately differs, which hinders the goal of having a single charging station that can handle. For example, the A4WP standard is based upon a 6.78 MHz±15 kHz carrier frequency, while WPC and PMA use frequency ranges of 110~205 kHz and 110~300 kHz, respectively.

Some efforts have been made to provide wireless power transfer at two distinct frequencies. These approaches use a single resonator with lumped impedance matching to enable wireless power transfer at two distinct frequencies. See, M.-L. Kung, and K.-H. Lin, "Enhanced analysis and design method of dual-band coil module for near-field wireless power transfer systems," *IEEE Trans. Microw. Theory and Techniques*, vol. 63. No. 3, pp. 821-832, March 2015; M. Dionigi, and M. Mongiardo, "A novel resonator for simultaneous wireless power transfer and near field magnetic communications," in *Proc. IEEE International Microwave Symposium*, 2012, pp. 1-3. The Kung et al device operated at 6.78 MHz and 13.56 MHz while the Dionigi et al device operated at 11 MHz and 36 MHz.

The present inventors have identified the single-coil approach as non-optimal from an efficiency perspective to operate wireless power transfer transmitters at two separate frequencies using a single coil. The present inventors have identified that the single coil approach presents particular problems when the two frequencies differ significantly from each other. For example, the A4WP standard operates at 6.78 MHz, which is 33 times higher than the 200 kHz for WPC/PMA. The present inventors have identified that the optimal value of Tx inductance, and therefore the coil size and number of turns, varies significantly with operating frequency. Thus, a coil optimized at 6.78 MHz will not be optimal at 200 kHz.

Others have sought to make the device that receives power cooperate with multiple charging devices. See, P. Riehl, A. Satyamoorthy, H. Akram, Y.-C. Yen, J.-C. Yang, B. Juan, C.-M. Lee, F.-C. Lin, V. Muratov, W. Plumb, and P. Tustin, "Wireless power systems for mobile devices supporting inductive and resonant operating modes," *IEEE Trans. Microw. Theory and Techniques*, vol. 63. No. 3, pp. 780-790, March 2015. In this approach, a mobile device includes dual-band receiver coil which was tuned for operation at both 100 kHz and 6.78 MHz. The receiver can be powered by any one of the three wireless power standards. This approach will not be practical for many portable device platforms because receiver coils in such platforms often have strict size constraints, limiting achievable efficiency. For example, the 100 kHz coil in the Riehl et al proposal is placed inside the 6.78 MHz coil with a gap between the coils, limiting the outer diameter of the 100 kHz coil, which thereby limits the coupling with the transmitter.

There have also been efforts to include data and power transfer at separate frequencies. See, M. Ghovanloo, and S. Atluri, "A wide-band power-efficient inductive wireless link for implantable microelectronic devices using multiple carriers," *IEEE Trans. Circuits. Syst.*, vol. 54, no. 10, pp. 2211-2221, October 2007. This paper proposed a dual-frequency wireless power/wireless data system for implantable electronics. The two Tx coils, one for power and another for data, are placed orthogonally to each other in the transmitter in order to prevent interference between the two coils. This is effective for power and data transmission to one receiver, but would not be applicable to a multi-receiver use-case because the receiver would also need to be equipped with orthogonal coils, which is not feasible in most portable devices that have thin, planar geometries.

Another paper discusses a multi-frequency inductive power transfer system which amplified both the fundamental and the third harmonic generated by a full-bridge inverter in order to transfer power to a receiver at both frequencies. Z. Pantic, K. Lee, and S. Lukic, "Multifrequency inductive power transfer," *IEEE Trans. Power Electron.*, vol. 29, no. 11, pp. 5995-6005, November 2014. This proposed system works for single-receiver operation, and has a limited separation between the frequencies, and cannot operate at both 200 kHz and 6.78 MHz.

SUMMARY OF THE INVENTION

A preferred embodiment of the invention is a wireless power transmitting device that includes two coils respectively configured for transmission at two separated wireless power transmission frequencies. A dedicated current or voltage driver is provided for each of the two coils. A controller causes the current or voltage drivers to selectively or concurrently generate an AC magnetic field at either of the frequencies or both frequencies. A method includes concurrently driving two coils arranged with respect to each other to reduce losses at two separated wireless power transmission frequency bands while suppressing eddy currents in the path of one of the two coils. The frequencies can be separated by five, ten or a hundred or more multiples of the lower frequency, while still obtaining high transmission efficiency. The suppression of eddy currents uses a high impedance to the higher frequency. The high impedance suppresses eddy currents of the higher one of the two frequencies in a path of a lower one of the two frequencies with an impedance that is at least four times higher than impedance to the lower one of the two frequencies.

DETAILED DESCRIPTION OF THE PREFERRED EMBODIMENTS

Figure 1A:
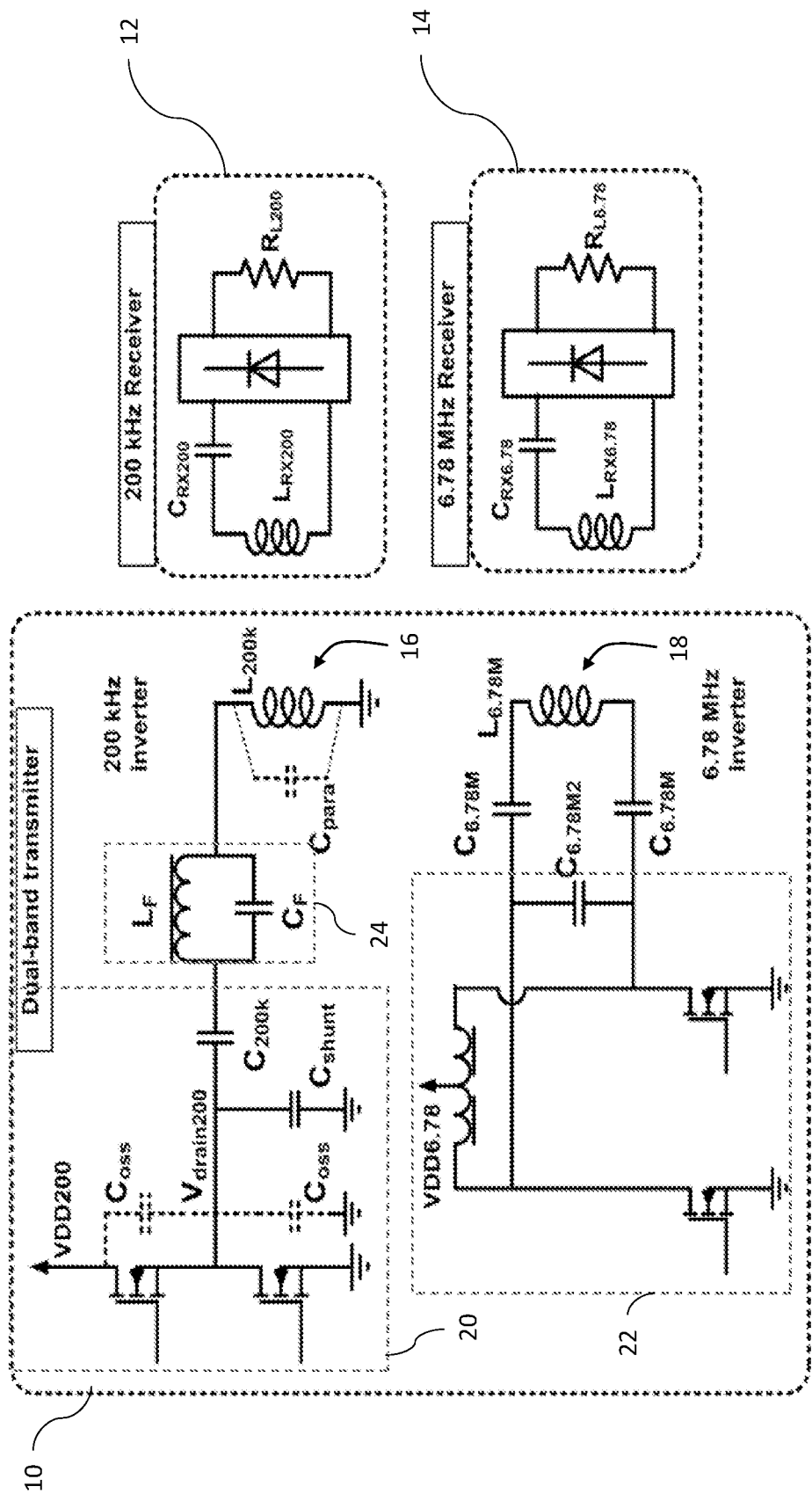
FIG. 1A is a schematic diagram illustrating a preferred embodiment dual frequency wireless power transfer device of the invention with two receivers.

Preferred embodiments provide devices and methods for wireless power transmitting that can transfer power to devices having at least two different power reception frequencies. In preferred embodiments, the transfer can be concurrent, enabling two separate devices operating at two different power reception frequencies to receive power simultaneously. Advantageously, methods and devices of the invention can provide optimal or near optimal efficiency at two separated ferquency bands during concurrent power transfer.

A preferred embodiment of the invention is a wireless power transmitting device that can transfer power to devices have two separte wireless power reception frequencies, such as two of three of the Alliance for Wireless Power (AW4P), the Qi-Wireless Power Consortium (WPC), and the Power Matters Alliance (PMA) standards. The device includes two coils respectively configured for transmission at two separated predetermined wireless power transmission frequency bands that each conform to a wireless power transmission frequency standard. The device includes a dedicated current or voltage driver for each of the two coils. Control causes the current or voltage drivers to selectively generate an AC magnetic field at both frequencies concurrently. The two coils can be coplanar or stacked adjacent to one another. The device preferably includes an LF-CF filter to inhibit eddy current from one of the two separated predetermined wireless power transfer frequencies from flowing through one of the two coils configured for the other of the two separated predetermined wireless power transfer frequencies.

Embodiments of the invention include methods and devices that generate and transmit a magnetic field at two separated frequencies frequency bands simultaneously, which is able to concurrently power two receivers of different resonant frequencies.

Preferred embodiments of the invention will now be discussed with respect to the drawings and with respect to experiments that have demonstrated preferred embodiments of the invention. The drawings may include schematic representations, which will be understood by artisans in view of the general knowledge in the art and the description that follows. Features may be exaggerated in the drawings for emphasis, and features may not be to scale. Artisans will appreciate broader aspects of the invention from the following discussion of experiments and specific embodiments.

FIG. 1A schematically illustrates a preferred wireless power transmitting device 10 with two receivers 12 and 14 that can sequentially or simultaneously receive power transfer from the wireless power transmitting device 10. The wireless power transmitting device includes transmission coils 16 and 18 for transmitting power at two separated predetermined frequencies, which are L200k and L6.78M in the FIG. 1 embodiment. More generally, two separated bands having significant frequency separation can be used. Significant frequency separation exists between the A4WP standard (6.78 MHz±15 kHz) and either of the WPC and PMA frequency ranges of 110~205 kHz and 110~300 kHz, respectively. The FIG. 1A embodiment is therefore within both of the WPC and PMA ranges. More generally, the invention can overcome problems frequency ranges that are separated by 5×, 10× and 100× or more multiples of the lower range.

The receivers 12 and 14 can be, for example, two mobile devices having different wireless charging receivers. Each coil 16 and 18 is driven by a dedicated current or voltage driver. In the FIG. 1 example, the coil 16 is driven by a dedicated voltage driver 20 and the coil 18 by a dedicated current driver 22. The two coils 16 and 18 can generate AC magnetic fields at both frequencies concurrently when driven by the drivers 20 and 22. A controller (not shown in FIG. 1) applies power to the drives 20 and 22. The controller can be a simple power switch or can consist of an unswitched connection to a power supply, such as an AC power supply or a battery. In other embodiments, the controller can detect the presence of receivers and power one or both of the drivers 20 and 22 in response to the presence of a receiver of the corresponding frequency. An LF-CF filter 24 inhibits a 6.78 MHz eddy current driven by the 6.78 MHz coil 18 from flowing through the 200 kHz transmitter path. The path includes the coil, LF-CF filter, $C_{200\,k}$ and $C_{shunt}$. While the coils 16 and 18, and the filter 24, are set to respective predetermined frequencies and impedance, tunable coils and filters can be used in other embodiments, which allows switching frequencies. In such a case, the controller might include a selection switch to select two frequencies from a plurality of possible frequencies.

Figure 1B:
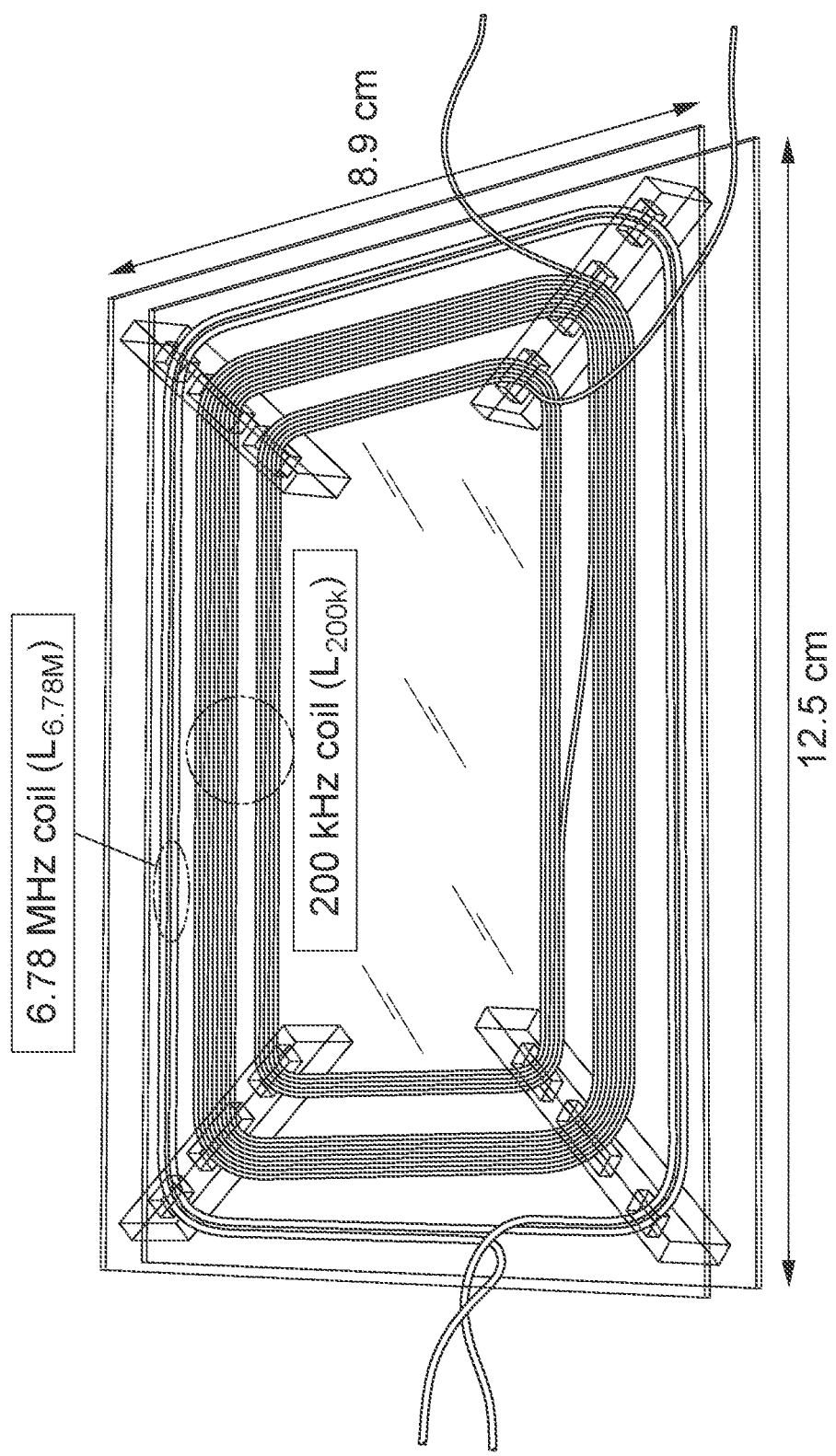
FIG. 1B is an image of a preferred embodiment and experimental coil arrangement for the transmission (Tx) coils in the FIG. 1A device.

The coils 16 and 18 in FIG. 1 are arranged in a co-planar or stacked adjacent arrangement. FIG. 1B illustrates a co-planar and concentric arrangement from an experimental device that was consistent with FIG. 1A. Other coil geometries and arrangements can be used. Example alternative coil geometries and arrangements include circular coils, elliptical coils, figure eight coils, Helmholtz coils, etc. In each configuration, it is preferred that the higher frequency coil is outside of lower frequency coil.

Figures 2A, 2B:
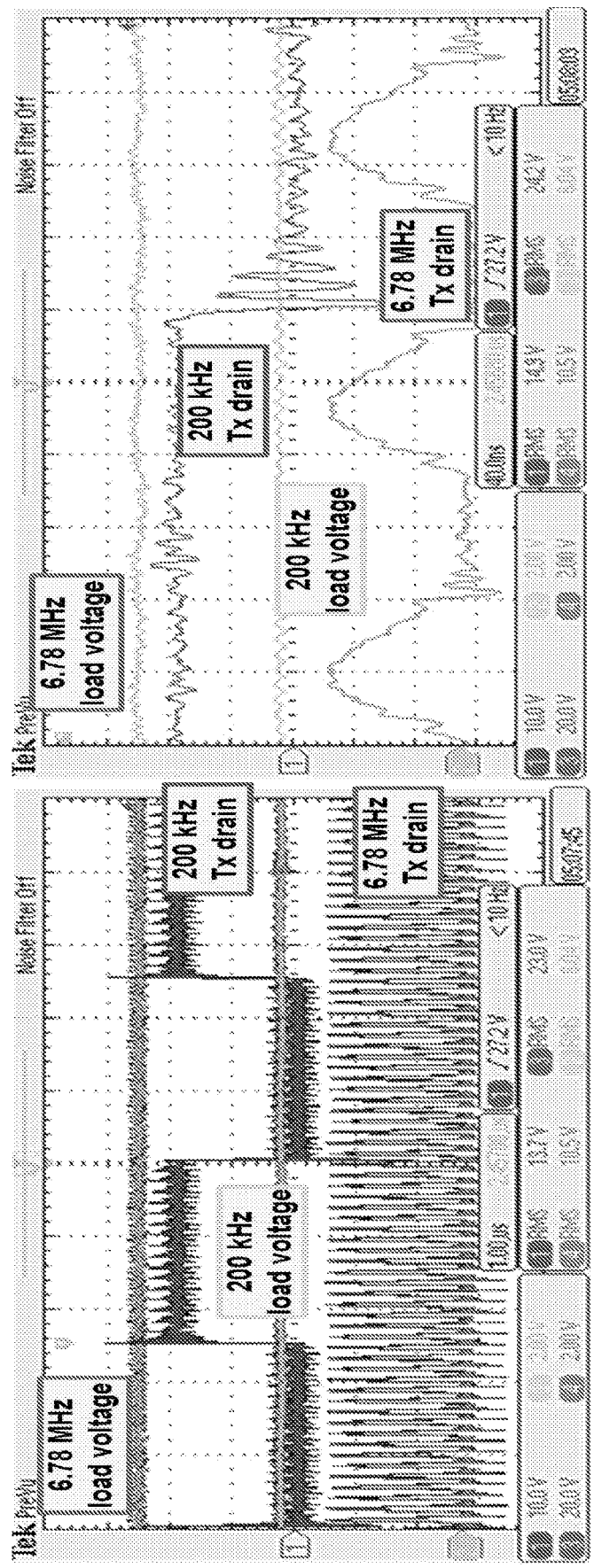
FIGS. 2A and 2B are example waveforms from an experimental device in accordance with FIGS. 1A and 1B.
Figure 3A:
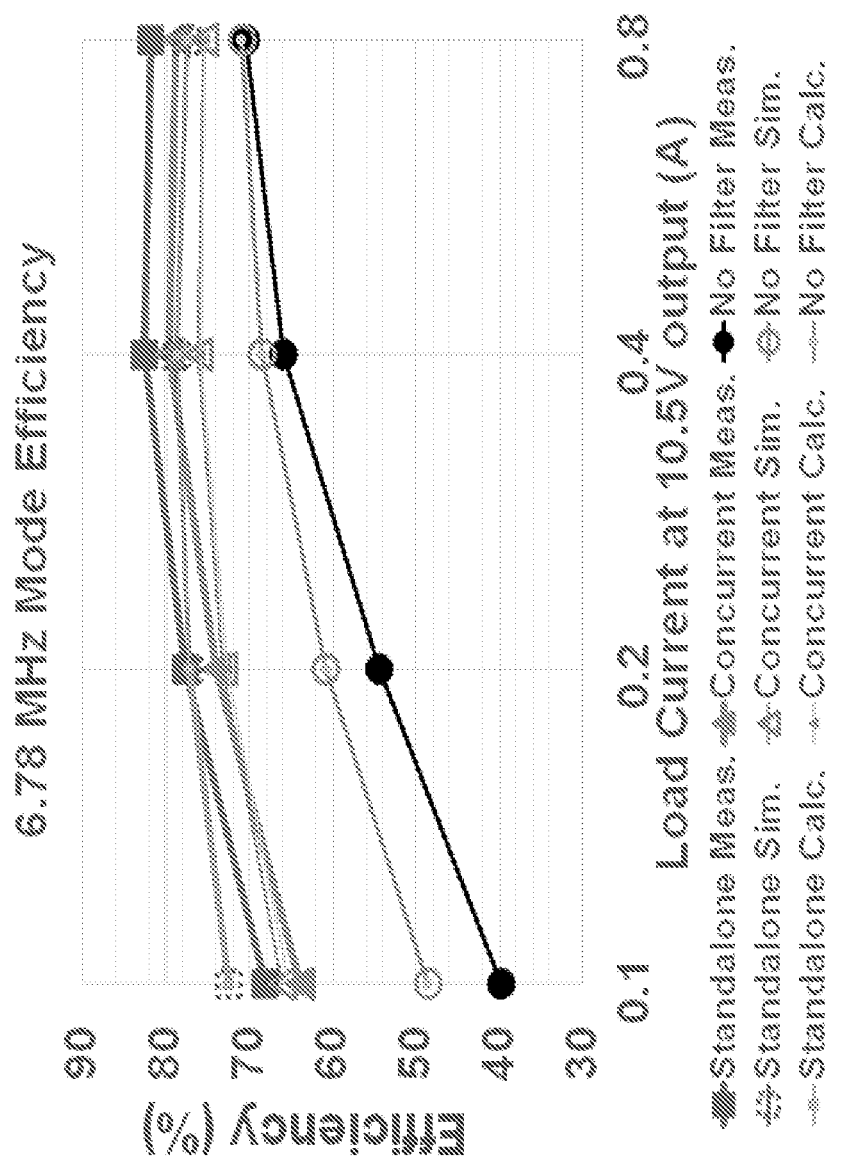
FIGS. 3A and 3B are example efficiency plots from an experimental device in accordance with FIGS. 1A and 1B.
Figure 3B:
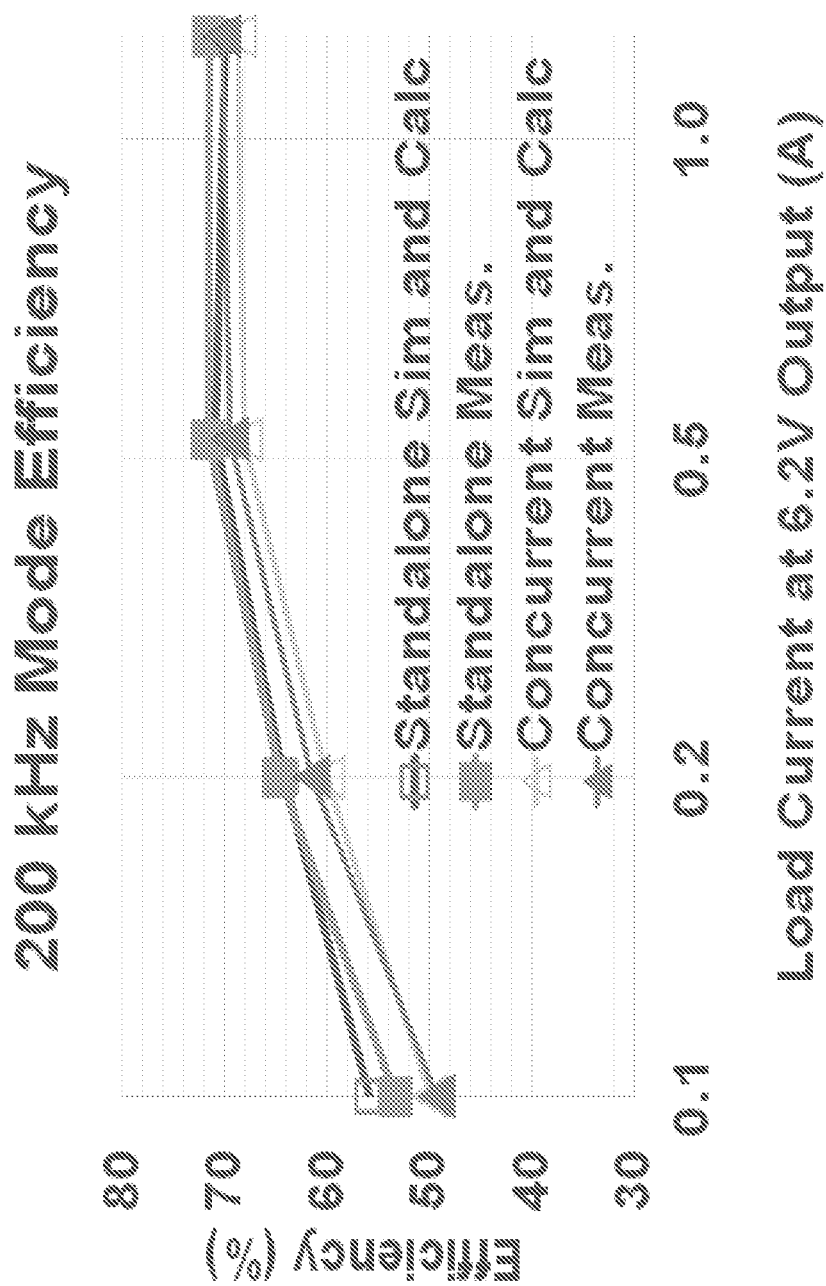

To great advantage, the preferred embodiment of FIGS. 1A and 1B and other embodiments allow design optimization at both frequencies. Specifically, the coil inductance and Q-factor selection for one frequency can be decoupled from the selection for another frequency. The ability to provide concurrent dual-frequency operation is also a great advantage, permitting simultaneous charging of two devices. Experimental prototypes have been constructed and tested, with high efficiency power transfer within the 110~300 kHz and 6.78 MHz±15 kHz standards, and expanded ranges of those standards. Expanded ranges include the frequencies comprise 6.78 MHz±30 kHz and 30~400 kHz frequencies, and a coil for the 30~400 kHz frequency. Example waveforms are shown in FIGS. 2A and 2B and efficiencies at the different frequencies are shown in FIGS. 3A and 3B.

Preferred embodiments consistent with FIGS. 1A and 1B provide a wireless power transfer (WPT) transmitter that can concurrently operate within all of the A4WP, WPC and PMA frequency ranges in order to simultaneously power two receivers including one or more from the higher A4WP and one or more from the WPC and PMA ranges concurrently. Unlike a dual-resonant single-coil design, the use of two separate coils decouples the design for one frequency from the other, enabling independent selection of inductance and Q-factor to simultaneously maximize efficiency at both frequencies. The two coils then support separate coil drivers, enabling concurrent multi-standard operation. Dual-band operation is achieved in the same area as an equivalent single-band design by placing a low-frequency coil within the geometry of a high-frequency coil, where the outer diameter of inner coil is sacrificed only by 1.2 cm in a 12.5×8.9 cm$^2$ design. Circuit analysis can be conducted in designs consistent with the invention to identify the eddy current between the two Tx coils and its associated loss, after which an eddy current filter design is provided. An experimental dual-mode transmitter consistent with FIGS. 1A and 1B was tested, along with two receivers designed at 6.78 MHz and 200 kHz respectively. At 25 mm separation, the experiment system is able to simultaneously deliver 9 W and 7.4 W with efficiencies of 78% and 70.6% at 6.78 MHz and 200 kHz, respectively.

Figure 4:
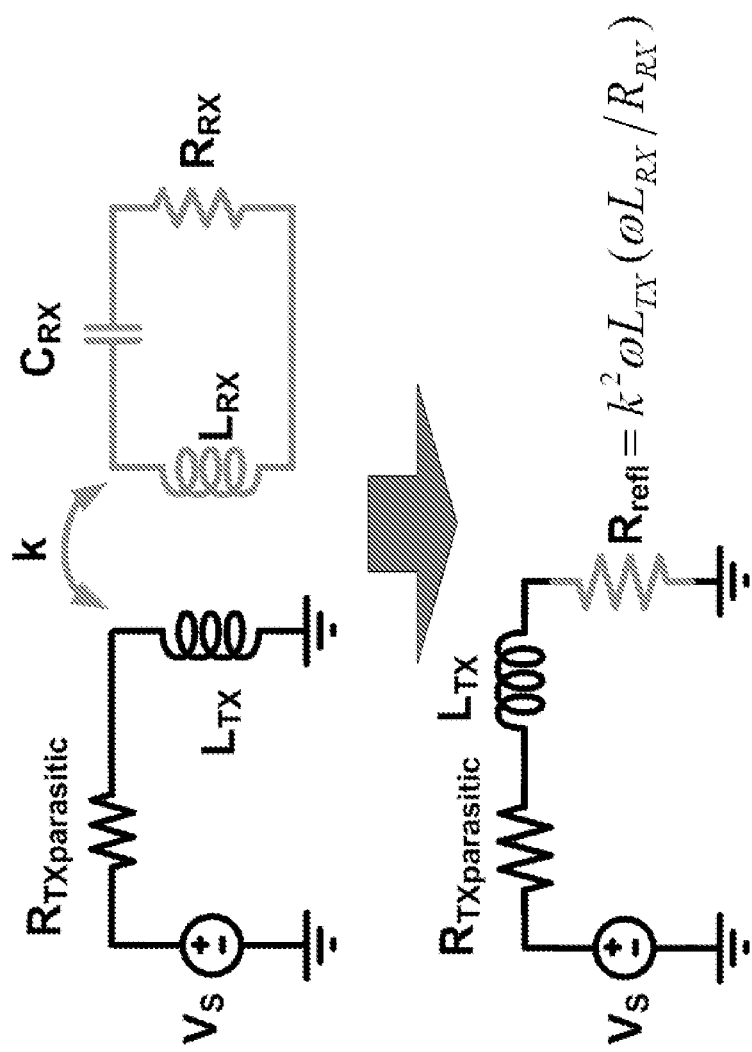
FIG. 4 illustrates a basic circuit model of a wireless power transfer system that is useful to understand design of systems consistent with FIGS. 1A and 1B.

FIG. 4 illustrates a basic circuit model of a wireless power transfer system that is useful to understand design of systems consistent with FIGS. 1A and 1B. The effect of receiver 16 or 18 is abstracted as a reflected resistance $R_{refl}$. The $R_{refl}$ should be in appropriate range for the efficient operation of the corresponding Tx inverter. The FIG. 4 circuit models the effect of coupling between the Tx and Rx is abstracted as a reflected resistance Rren [see, D. Ahn and S. Hong, "Wireless power transfer resonance coupling amplification by load-modulation switching controller," IEEE Trans. Ind. Electron., vol. 62, no. 2, pp. 898-909, February 2015]:

$$R_{refl} = k^2 \omega L_{TX} (\omega L_{RX}/R_{RX}) \quad (1)$$

where $L_{TX}$ is the inductance of the transmitting coil, $L_{RX}$ is the inductance of the receiving coil, $R_{RX}$ is the receiver load resistance, and k is the coupling coefficient between $L_{TX}$ and $L_{RX}$. The $R_{refl}$ resistance is connected in series with the Tx coil, $L_{TX}$. The Tx inverter (or power amplifier), which is modeled as a voltage source Vs, is loaded by the reflected resistance $R_{refl}$ and some parasitic resistance, $R_{TXparasitic}$. Note that capacitive tuning on the transmitter side can be incorporated for resonant operation, but is not shown here for simplicity. For high efficiency and high output power, $R_{TXparasitic}$ should be designed to be as small as possible, while $R_{refl}$ should be designed as a compromise between maximum power transfer (when matched to $R_{TXparasitic}$), and maximum efficiency (when $R_{refl} \gg R_{TXparasitic}$).

Since k and receiver parameters ($\omega L_{RX}/R_{RX}$) are roughly constant across frequency in practical designs, the reflected resistance is directly proportional to $\omega L_{TX}$. This implies that a different value of $L_{TX}$ is required for each operational frequency, co, to ensure appropriate reflected resistance. For example, an inductance value of 1.2 pH is ideal for operation at 6.78 MHz in designs consistent with FIGS. 1A and 1B, as a coupling coefficient of 0.1 and a receiver quality factor, $Q_{RX}$, of 10, results in a reflected resistance is 5.1 S, which is considerably higher than an $R_{TXparasitic}$ of 0.5) (comprising the parasitic resistance of the power MOSFET, transmitter coil, and PCB pattern traces). This setup results in a Tx efficiency of 5.1/(5.1+0.5)=91%. However, for 200 kHz operation with the same $L_{TX}$, $Q_{RX}$, and k, the reflected resistance is only 0.15Ω, which is now comparable to the parasitic resistances. Assuming these parasitics are optimistically scaled to 0.1Ω at 200 kHz, the Tx efficiency would be no greater than 0.15/(0.15+0.1)=60%. As a result, it is important to design the Tx inductance, $L_{TX}$, to the appropriate value for each operational frequency. For this reason, a single Tx coil, even if coupled with an ideal dual-band resonant matching network which in theory can enable concurrent operation, has difficulty achieving high efficiency, especially as the separation between the two frequencies increase. For example, to increase the reflected impedance at 200 kHz, an $L_{TX}$ of 24 μH would be ideal because it would produce several ohms of reflected resistance for increased efficiency and sufficient output power. While further increases to the inductance value could be made in both the 6.78 MHz and 200 kHz transmitters to increase efficiency, the larger associated reflected resistance would serve to decrease the achievable transmitted power, which is not necessarily desirable.

Figure 5A:
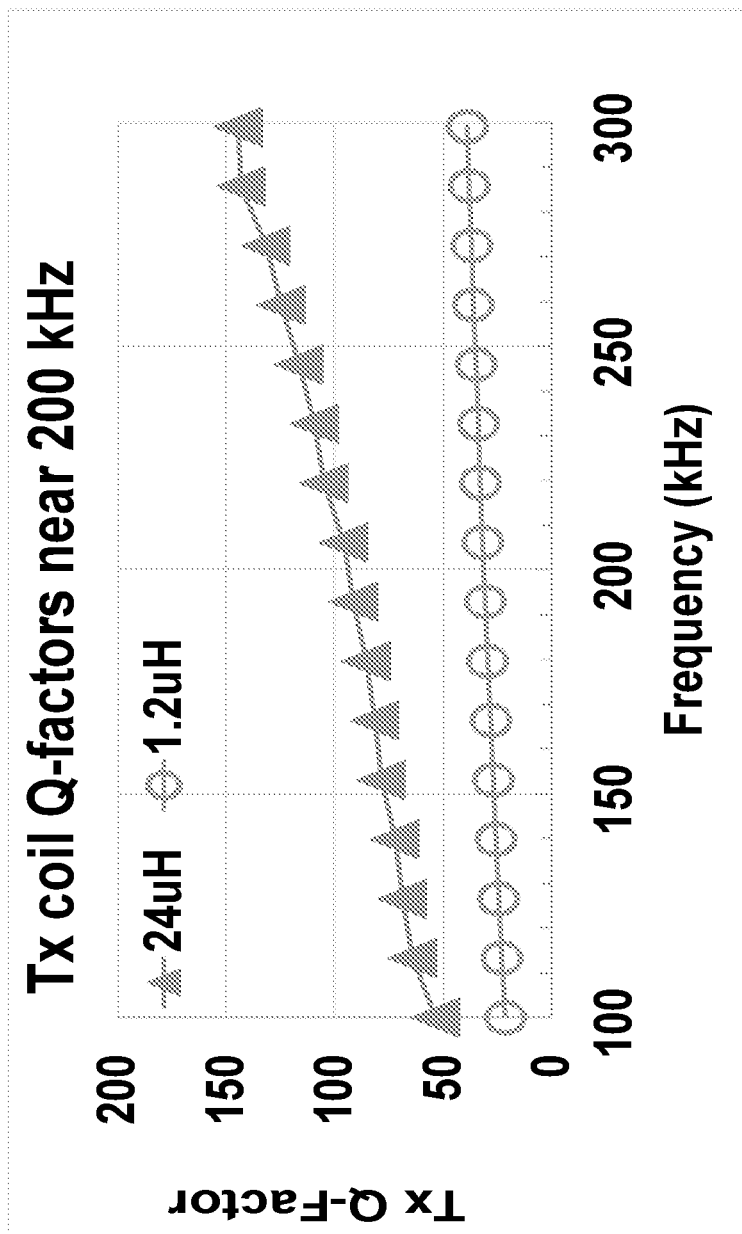
FIGS. 5A and 5B are plots measured Tx coil Q-factors at two different frequency bands.
Figure 5B:
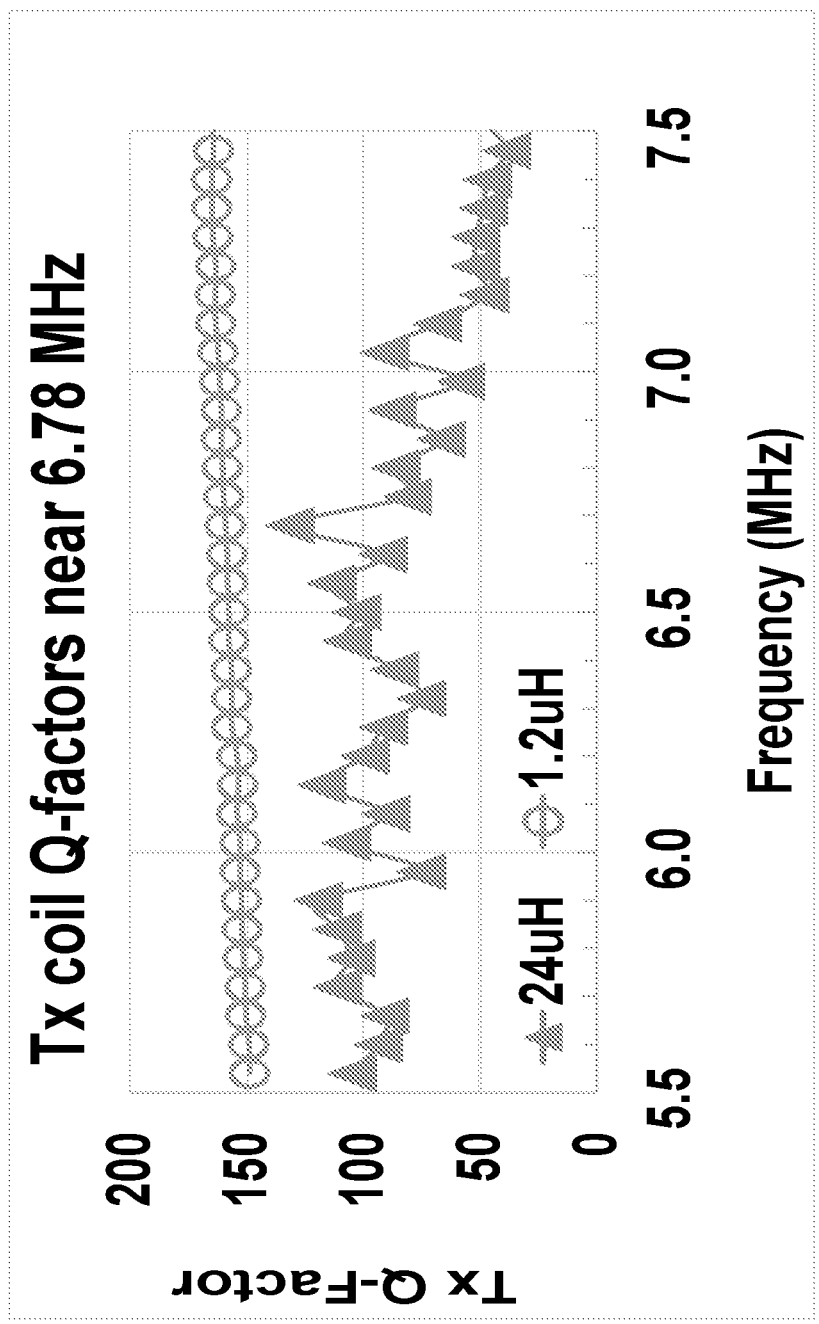

The Q-factor of a given Tx coil is also affected by the operational frequency. As shown in FIGS. 5A and 5B, the Q-factor of smaller inductors is generally maximized at higher frequencies (6.78 MHz), whereas that of larger inductors tends to be maximized at lower frequency (200 kHz). Since it can be shown that the efficiency and power transfer capabilities of wireless power transfer links both increase with Q of the constituent coils [P. P. Mercier and A. P. Chandrakasan, "Rapid wireless capacitor charging using a multi-tapped inductively-coupled secondary coil," IEEE Trans. Circuits Syst., vol. 60, no. 9, pp 2263-2272, September 2013], and given the analysis presented in the preceding paragraph, it is desirable to operate high-frequency coils with smaller Tx inductance and low-frequency coils with larger Tx inductance.

Figure 6:
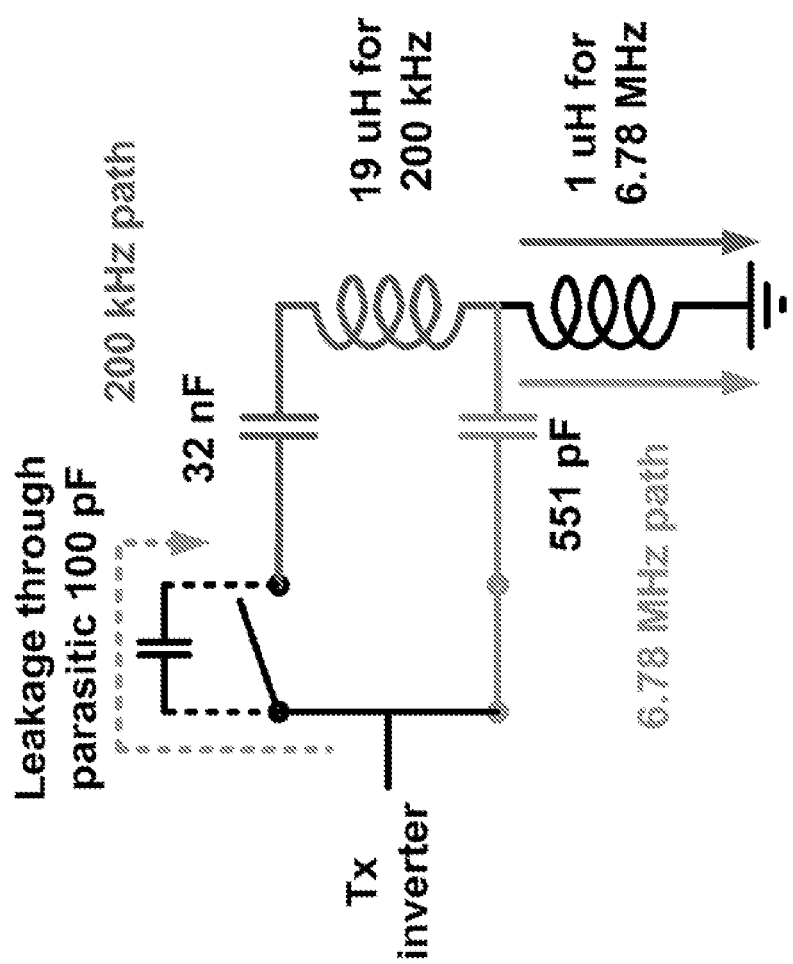
FIG. 6 is a model of a transmitter which has a switch to disconnect a 200 kHz Tx coil when 6.78 MHz is in operation, but illustrates that 200 kHz coil is not easily disconnected due to the parasitic capacitance of switch.

Unfortunately, it is difficult to design coils with variable inductance or design matching networks with two resonant frequencies, especially when one of the desired operating frequencies is 5, 30, or 100 times higher than the other. This problem is illustrated by FIGS. 5A, 5B and FIG. 6. For example, it should be possible in theory to use a switch as in FIG. 6 inserted into a tap point in the inductor to dynamically select the appropriate amount of desired inductance for time-sequenced dual-band operation, as was presented in [P. P. Mercier and A. P. Chandrakasan, "Rapid wireless capacitor charging using a multi-tapped inductively-coupled secondary coil," IEEE Trans. Circuits Syst., vol. 60, no. 9, pp 2263-2272, September 2013]. However, unlike that work, which operated at a single frequency, the switch parasitics in multi-frequency operation limit the effectiveness of this technique. FIG. 6 illustrates a Tx schematic which has a switch to disconnect the 200 kHz Tx coil. Unfortunately, the typical parasitic capacitance of a high-power MOSFET is on the order of ~100 pF, which easily (and unintentionally) resonates with the lower frequency coil. To illustrate, a 19 µH Tx coil designed for operation at 200 kHz resonates at 3.7 MHz with the 100 pF parasitic capacitor. Thus, at 6.78 MHz, the reactive impedance of the 100 pF capacitor is much lower than that of the 19 µH inductance, and therefore effectively shorts the 19 µH Tx coil into the 6.78 MHz power path. Once the 19 µH 200 kHz Tx coil is shorted to the 6.78 MHz path, it behaves as an eddy current loop for the 6.78 MHz transmitter, since the two Tx coils are closely packed within a single Tx device. SPICE-level coil simulations indicate that the efficiency is degraded from 89.2% to 57% when a parasitic capacitance of 100 pF is introduced. Another drawback of Tx coil selection using a switch is that only one frequency can be activated at a time. Thus, although the Tx charging pad area is often wide enough to accommodate multiple receivers, only one receiver can be charged if the frequencies of each receiver are different. For these reasons, switch-tuned dual-band operation is not a practical design.

Figure 7:
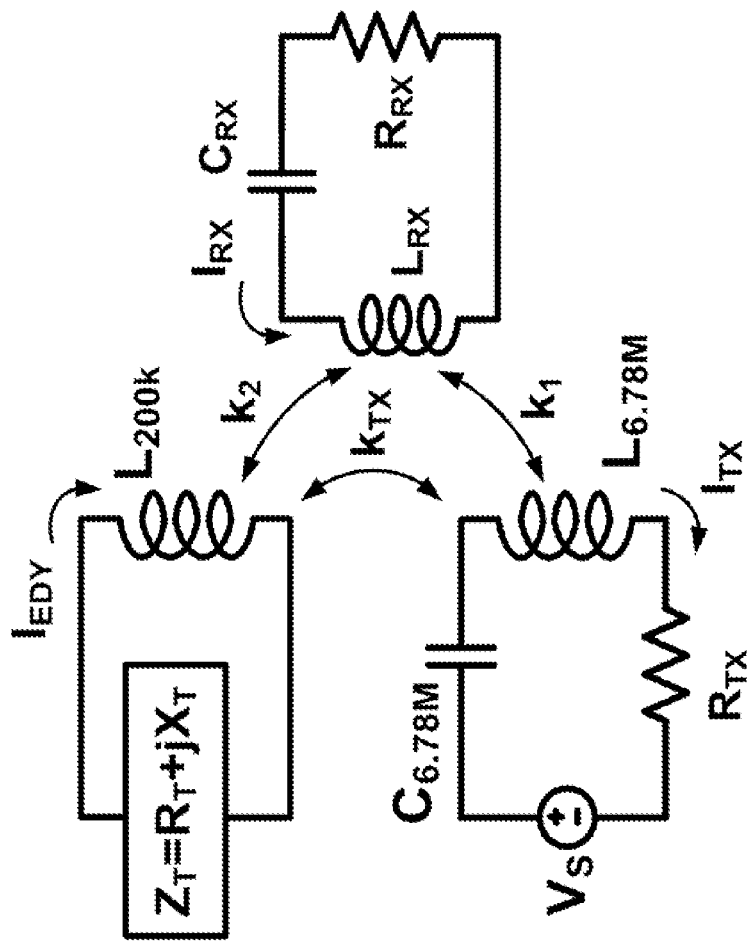
FIG. 7 provides a coil analysis circuit model for the FIGS. 1A and 1B dual band power transmitter.

FIG. 7 provides a coil analysis circuit model for the FIGS. 1A and 1B dual band power transmitter. To enable concurrent dual-band frequency operation with high efficiency, the FIGS. 1A and 1B wireless power transmitting device 10 is implemented with two separate coils 18, $L_{6.78\ M}$ and 16, $L_{200\ k}$, appropriately sized for maximal efficiency at 6.78 MHz and 200 kHz, respectively. Each coil features shunting and/or blocking filters to reduce coupled losses. The filter 24 is in the form of an auxiliary resonant tank, $L_F$-$C_F$, is in series with the 200 kHz stage, and is tuned to a resonant frequency of 6.78 MHz. This tank acts as a filter whose impedance is high at 6.78 MHz, which helps to minimize both the undesired crosstalk from the 6.78 MHz power carrier to 200 kHz power transistors, and the eddy current losses of the 6.78 MHz transmitter through the 200 kHz path. The $C_{200\ k}$ is then tuned to compensate for the sum of $L_{200\ k}$ and $L_F$. Similarly, capacitors $C_{6.78\ M}$, which are nominally required in the 6.78 MHz path for resonant operation, act as a high-impedance filter to the 200 kHz inverter, minimizing losses during 200 kHz operation.

6.78 MHz Operation Mode.

The low impedance of $C_{oss}$ and $C_{shunt}$ in the 200 kHz output network behaves as an eddy current loop for 6.78 MHz carrier if the $L_F$-$C_F$ filter is not used. The required impedance value of the $L_F$-$C_F$ tank can be determined by analyzing the circuit model of FIG. 7. Impedance $Z_T$ shown in Fig. FIG. 7 is the total impedance along the eddy current loop which consists of $L_F\|C_F$, $C_{200\ k}$, $C_{oss}+C_{shunt}$, $C_{para}$, and the parasitic resistance of $L_{200\ k}$. FIG. 7 can be characterized by the following Kirchoff's voltage law expressions:

$$\left(j\omega L_{6.78} - j\frac{1}{\omega C_{6.78}} + R_{TX}\right)I_{TX} + \qquad (2)$$
$$jk_1\omega\sqrt{L_{6.78}L_{RX}}\ I_{RX} + jk_{TX}\omega\sqrt{L_{6.78}L_{200}}\ I_{EDY} = V_S$$
$$jk_1\omega\sqrt{L_{6.78}L_{RX}}\ I_{TX} + \left(j\omega L_{RX} - j\frac{1}{\omega C_{RX}} + R_{RX}\right)I_{RX} +$$
$$jk_2\omega\sqrt{L_{200}L_{RX}}\ I_{EDY} = 0$$
$$jk_{TX}\omega\sqrt{L_{6.78}L_{200}}\ I_{TX} + jk_2\omega\sqrt{L_{RX}L_{200}}\ I_{RX} + (j\omega L_{200} + Z_T)I_{EDY} = 0$$

where ω is the 6.78 MHz operating frequency, $k_{TX}$, $k_1$, and $k_2$ are the coupling coefficients between the coils, and $I_{TX}$, $I_{RX}$, and $I_{EDY}$ are the coil current phasors. Simplifying (2) at resonance yields:

$$\left(\frac{R_{TX}}{j\omega L_{6.78}}\right)I_{TX} + k_1\sqrt{\frac{L_{RX}}{L_{6.78}}}\ I_{RX} + k_{TX}\sqrt{\frac{L_{200}}{L_{6.78}}}\ I_{EDY} = \frac{V_S}{j\omega L_{6.78}} \qquad (3)$$
$$k_1\sqrt{\frac{L_{6.78}}{L_{RX}}}\ I_{TX} + \frac{1}{jQ_{RX}}I_{RX} + k_2\sqrt{\frac{L_{200}}{L_{RX}}}\ I_{EDY} = 0$$
$$k_{TX}\sqrt{\frac{L_{6.78}}{L_{200}}}\ I_{TX} + k_2\sqrt{\frac{L_{RX}}{L_{200}}}\ I_{RX} + \left(1 + \frac{Z_T}{j\omega L_{200}}\right)I_{EDY} = 0$$

where $Q_{RX}=\omega L_{RX}/R_{RX}$. By solving (3), we can obtain $I_{TX}/I_{RX}$ which indicates how much Tx driving current is required to deliver a given amount of current across receiver load.

$$\frac{I_{TX}}{I_{RX}} = -\frac{\frac{Z_T}{\omega L_{200}} + k_2^2 Q_{RX} + j}{k_1 Q_{RX}\left(\frac{k_2}{k_1}k_{TX} - 1 + j\frac{Z_T}{\omega L_{200}}\right)}\sqrt{\frac{L_{RX}}{L_{TX}}} \qquad (4)$$

Equation (4) indicates that the required driving current depends on $Z_T$.

Operation without $L_F$-$C_F$ Filter

Now suppose that the $L_F$-$C_F$ filter is not used. Then, $Z_T$ is the sum of impedances of $C_{200\ k}$, $C_{oss}+C_{shunt}$, and the parasitic resistance of $L_{200\ k}$. Capacitance $C_{oss}$, which is the parasitic capacitance of the MOSFET switches, is typically higher than 100 pF. In addition, $C_{shunt}$ is needed to suppress the high voltage interference from 6.78 MHz. Assuming the minimum value of $C_{oss}$ is 100 pF, its impedance at 6.78 MHz is −j235Ω, which is one fifth of impedance of $\omega L_{200\ k}$=j1080Ω. The parasitic resistance of $L_{200\ k}$, which is the real part of $Z_T$, is typically a few ohms. That means the real and imaginary parts of impedance $Z_T$ are small compared to $\omega L_{200\ k}$, i.e. $|Z_T|\ll\omega L_{200\ k}$. Thus, Equation (4) becomes $$\frac{I_{TX}}{I_{RX}} \cong -\frac{k_2^2 Q_{RX} + j1}{k_1 Q_{RX}\left(\frac{k_2}{k_1}k_{TX} - 1\right)}\sqrt{\frac{L_{RX}}{L_{TX}}} \qquad (5)$$

Figure 8:
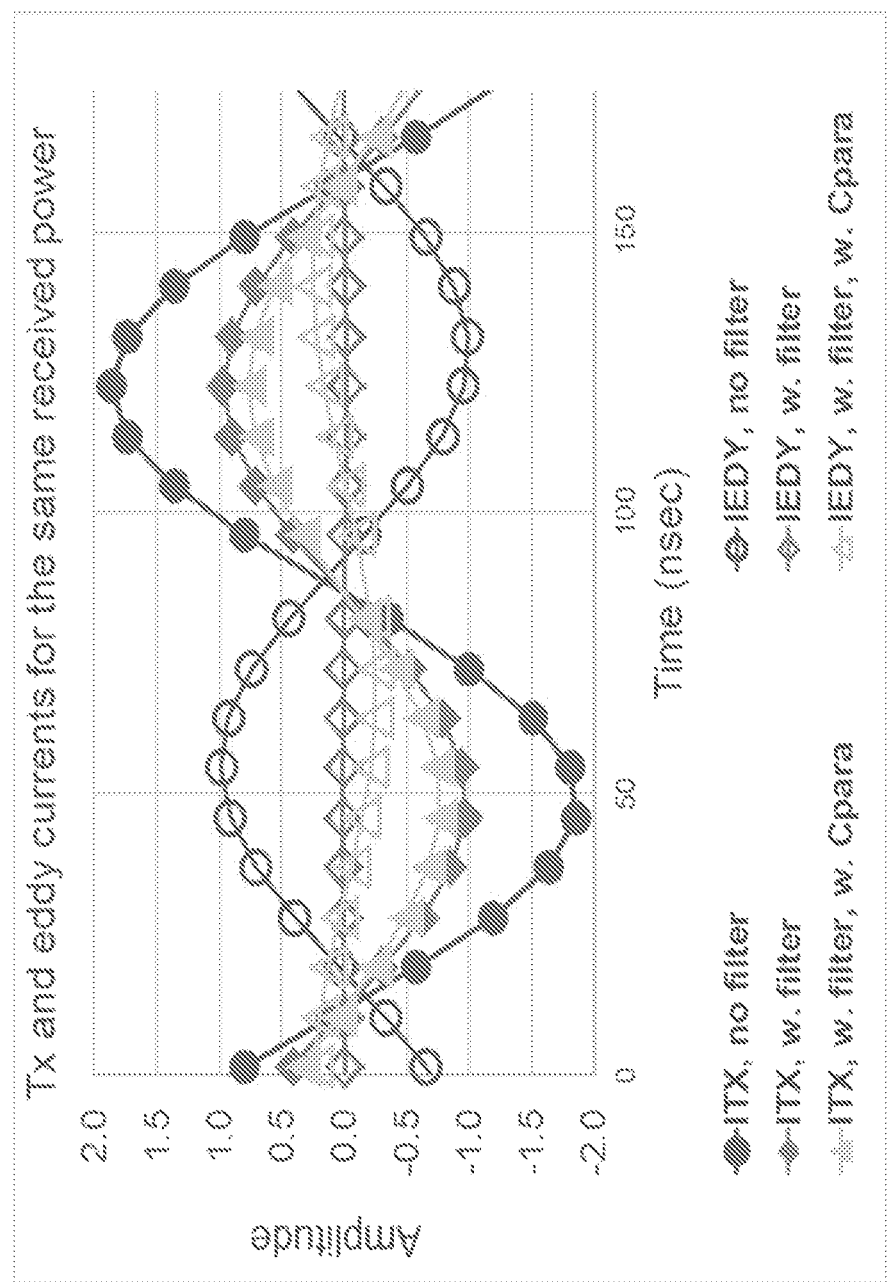
FIG. 8 includes simulated current waveforms of the FIGS. 1A and 1B wireless transmitter device with and without the $L_F$-$C_F$ filter.

FIG. 8 includes simulated current waveforms of the FIGS. 1A and 1B transmitting device with and without the $L_F$-$C_F$ filter. Without the high-Z filter, higher Tx driving current is required due to severe eddy currents that cancel the magnetic field. The eddy currents are scaled by a factor of $\sqrt{L_{200}/L_{TX}}$.

This implies to the present inventors that the required Tx driving current is increased by a factor of $1/(1-(k_2/k_1)k_{TX})$ if the $L_F$-$C_F$ filter is not used. This matches our intuition, since a significant portion of the magnetic field from the driving current is cancelled by magnetic fields stemming from the resulting eddy currents. A high level of Tx driving current for a given received power implies higher ohmic losses in the Tx coil and MOSFETs, which reduces efficiency. A thicker coil would then be required to withstand high resonant current and heat generation. Moreover, constituent semiconductor switches and passive components would need to withstand higher voltage and current ratings, which increase fabrication cost and often further increase parasitics. Since the two Tx coils, $L_{6.78\ M}$ and $L_{200\ k}$, are closely placed within a single transmitter device, the $k_{TX}$ value can be as high as 0.4–0.6, meaning that the driving current should be approximately doubled to transfer the same power.

The eddy current can be directly found by solving $I_{EDY}/I_{TX}$ from (3):

$$\frac{I_{EDY}}{I_{TX}} = -\frac{k_1 k_2 Q_{RX} + j k_{TX}}{\frac{Z_T}{\omega L_{200}} + k_2^2 Q_{RX} + j1} \sqrt{\frac{L_{TX}}{L_{200}}} \quad (6)$$

In (6), if $Z_T$ is small, the $jk_{TX}$ and j1 become the dominant terms and the phase of $I_{EDY}$ with respect to Ix is opposite.

Operation with $L_F$-$C_F$ Filter

However, if the $L_F$-$C_F$ filter is used, then $Z_T \gg \omega L_{200}$ is satisfied and Eqn. (4) simplifies to:

$$\frac{I_{TX}}{I_{RX}} = j\frac{1}{k_1 Q_{RX}} \sqrt{\frac{L_{RX}}{L_{TX}}} \quad (7)$$

This is equivalent to the case where there are no eddy current paths (i.e., equation (7) in [D. Ahn and S. Hong, "Effect of coupling between multiple transmitters or multiple receivers on wireless power transfer," *IEEE Trans. Ind. Electron.*, vol. 60, no. 7, pp. 2602-2613, July 2013]). Therefore, we determined that it is desirable to set the impedance $Z_T$ to be high (at least 4×) compared to $\omega L_{200}$ in order to inhibit eddy currents and therefore maintain a low Tx driving current. Doing so will inhibit excessive ohmic losses at the Tx coil while also limiting the otherwise necessary high voltage or current stress in the Tx devices.

FIG. 8 shows simulated current waveforms across three separate conditions, all for equal amount of received power (set by adjusting the Tx driving current). The eddy currents are scaled by a factor of $\sqrt{L_{200}/L_{TX}}$ to better visualize the contribution of eddy current on magnetic field cancellation with respect to the Tx driving current. The blue circle curves with the "no filter" label illustrate the case where the $L_F$-$C_F$ filter is not used and the eddy current flows through $L_{200\ k}$-$C_{200\ k}$-$C_{shunt}$. It can be seen that the eddy current, IEDY, is high and that the Tx driving current, ITX, is twice the amplitude of the high impedance cases. On the other hand, the "w. filter" labels indicate that the Tx driving current is small and the eddy current is suppressed.

In practice, however, there exists a parasitic capacitance, $C_{para}$, within $L_{200\ k}$. For example, the measured parasitic capacitance of a 24 pH, 7 cm×10.5 cm coil is 9.5 pF. The Tx currents when this parasitic is incorporated into the simulation model are shown as the triangular curves in FIG. 8. Although the eddy current is slightly increased compared to the zero-parasitic case, this eddy current does not significantly degrade the efficiency. The notable change is that this small eddy current is now almost in-phase with the Tx driving current, thereby reinforcing the magnetic field generated from Tx driving current, not cancelling it. As a result, the required Tx driving current, ITX with filter with $C_{para}$, is the lowest amongst all three presented simulations. Note that "no filter with $C_{para}$" is essentially the same as "no filter without $C_{para}$", because $C_{para}$ is connected in parallel with $C_{shunt}$ and $C_{oss}$ if the $L_F$-$C_F$ filter is not used, and since $C_{shunt}$ and $C_{oss}$ is much larger than $C_{para}$, the effect of $C_{para}$ is negligible when $L_F$-$C_F$ is not used. For the example presented in FIG. 8, the simulated coil efficiencies of no filter, with filter, and with filter and $C_{para}$ are 83.2%, 89.2%, and 88.6%, respectively. Note that while inclusion of $C_{para}$ helps to reduce the Tx driving current, it does slightly degrade efficiency, in this case by less than 1%.

The phase change of the eddy currents can be analyzed from (6) by setting $Z_T=1/(j\omega C_{para})$ assuming that the $L_F$-$C_F$ impedance is sufficiently high:

$$\frac{I_{EDY}}{I_{TX}} = -\frac{k_1 k_2 Q_{RX} + j k_{TX}}{k_2^2 Q_{RX} + j\left(1 - \frac{\omega_{self}^2}{\omega^2}\right)} \sqrt{\frac{L_{TX}}{L_{200}}} \quad (8)$$

Here, $\omega_{self}=1/\sqrt{L_{200} C_{para}}$ is the self-resonant frequency of $L_{200\ k}$. If $\omega_{self} > \omega$, $I_{EDY}$ is close to being in-phase with $I_{TX}$. The self-resonant frequency should not be lower than 6.78 MHz to inhibit the field-cancelling eddy current.

Efficiency Versus Filter Impedance

Although the eddy current is significantly suppressed by the present high-impedance filter, the power loss across the eddy current path still needs to be investigated since the real part of the impedance of the eddy current path is now high. To evaluate the contributions of each loss component, the overall resonator efficiency, ti, based on the derivation in [D. Ahn and S. Hong, "Effect of coupling between multiple transmitters or multiple receivers on wireless power transfer," *IEEE Trans. Ind. Electron.*, vol. 60, no. 7, pp. 2602-2613, July 2013] can be re-written as:

$$\eta = \frac{R_{RX}|I_{RX}|^2}{R_{TX}|I_{TX}|^2 + R_{RX}|I_{RX}|^2 + \text{Re}(Z_T)|I_{EDY}|^2} \quad (9)$$

$$= \frac{R_{RX}}{R_{TX}|I_{TX}/I_{RX}|^2 + R_{RX} + \text{Re}(Z_T)|I_{EDY}/I_{RX}|^2}$$

where $R_{TX}|I_{TX}/I_{RX}|^2$ and $\text{Re}(Z_T)|I_{EDY}/I_{RX}|^2$ are the relative power loss at Tx coil and eddy current path, respectively, with respect to the power delivered to receiver. The $I_{EDY}/I_{RX}$ can then be calculated as:

$$\frac{I_{EDY}}{I_{RX}} = \frac{j(k_{TX} - j k_1 k_2 Q_{RX})}{k_1 Q_{RX}\left(\frac{k_2}{k_1} k_{TX} - 1 + j\frac{Z_T}{\omega L_{200}}\right)} \sqrt{\frac{L_{RX}}{L_{200}}} \quad (10)$$

If the high-impedance filter is used (with $|Z_T| \gg \omega L_{200}$), the relative power loss in the eddy current path, $\text{Re}(Z_T)|I_{EDY}/I_{RX}|^2$, can be modeled as:

$$\text{Re}(Z_T)\left|\frac{I_{EDY}}{I_{RX}}\right|^2 \cong \text{Re}(Z_T) \frac{k_{TX}^2 + k_1^2 k_2^2 Q_{RX}^2}{k_1^2 Q_{RX}^2 \frac{|Z_T|^2}{\omega^2 L_{200}^2}} \frac{L_{RX}}{L_{200}} \quad (11)$$

In practice, $k_{TX}^2$ is higher than $k_1^2 k_2^2 Q_{RX}^2$ in Eqn. (11). Therefore, we note that it is desirable to reduce $k_{TX}$ as much as possible to minimize power losses in the eddy current path.

We also observe that Eqn. (11) indicates that the magnitude of impedance $Z_T$ should be large in order to reduce the power loss in eddy current loop. Even if the impedance is dominated by the real part of $Z_T$, Eqn. (11) predicts that the power loss is inversely proportional to the resistance, which nicely matches our intuition since the eddy current is inversely proportional to the resistance, while the power loss is proportional to resistor and to square of eddy current. We note that this trend is valid only when $|Z_T| \gg \omega L_{200}$. At very low filter impedances, a lower impedance yields higher efficiency because the eddy current does not dissipate ohmic power due to low parasitic resistance.

Fortunately, the employed $L_F$-$C_F$ filter can produce a high impedance (4 times higher than wL200 k) near resonance of the higher frequency. Measurement result of an implemented $L_F$-$C_F$ filter indicates that a 10 pH carbonyl core inductor and 47 pF capacitance produces 25874+j23900Ω at 6.78 MHz, which is more than 25× larger than $\omega L_{200}$.

Figure 9:
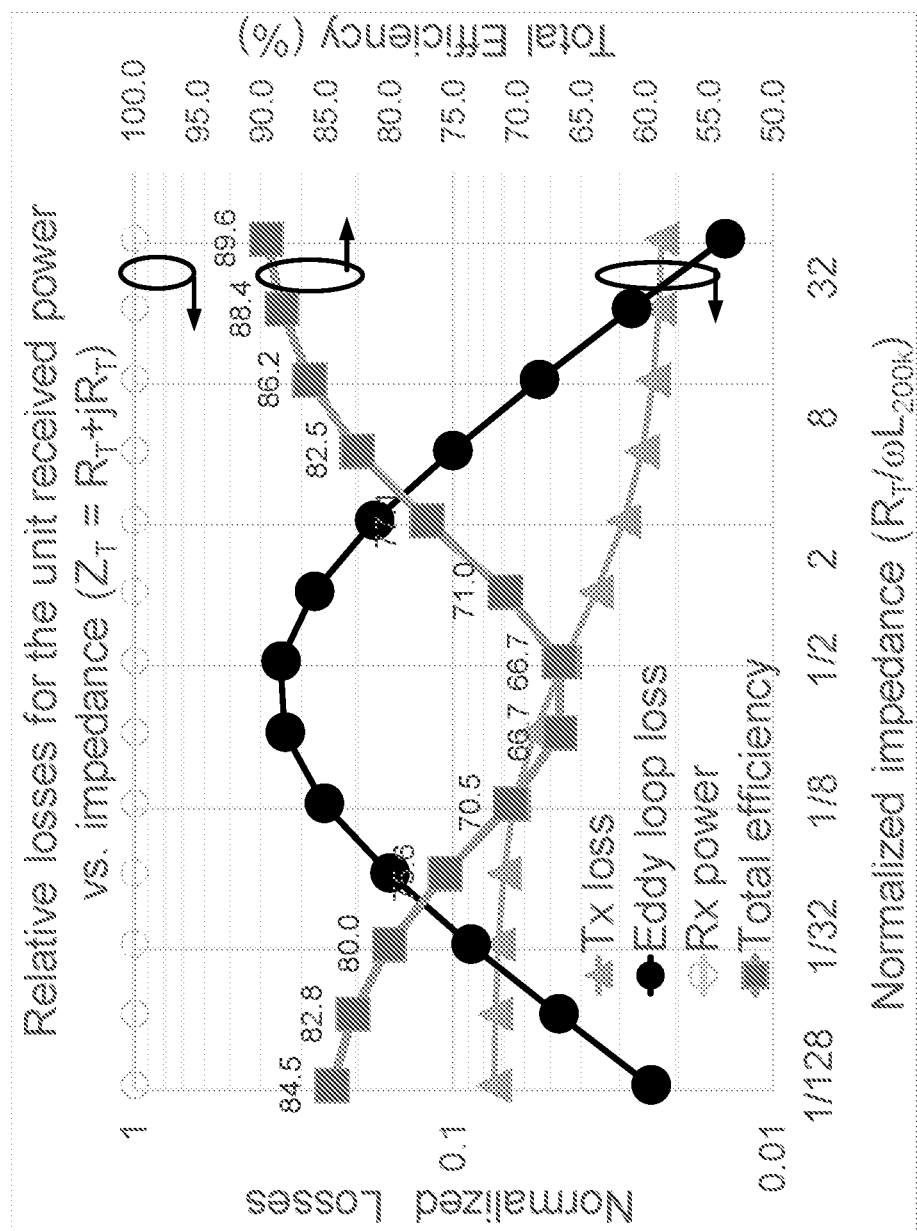
FIG. 9 plots calculated losses for each coil in FIGS. 1A and 1B and total coil efficiency.

To illustrate the effectiveness of the present $L_F$-$C_F$ filter, FIG. 9 shows the calculated losses for each loss component using Eqns. (4), (9), and (10), along with the achievable wireless power transfer efficiency based on measured parameters from an experiment setup. Specifically, FIG. 9 plots calculated losses for each coil in FIGS. 1A and 1B and total coil efficiency, plotted with respect to $R_T$ (both real and imaginary part of $Z_T$ is set to $R_T$ because filters with high real part tend to have high imaginary part). The filter impedance should be high compared with $\omega L_{200}$ k to minimize both the eddy loop loss and Tx coil loss. With 11.2 pH and 47 pF, an $R_T/\omega L_{200\ k}$ value of 25 is obtained. When $R_T$ is equivalent to the parasitic resistance of $L_{200\ k}$, which is 8.3Ω in this example, the normalized impedance is $8.3/(\omega L_{200\ k}) \sim 1/128$. At this low impedance, the Tx coil losses are high because the Tx current is high for a given received power due to severe eddy currents. As $R_T$ is gradually increased, Tx coil losses are reduced. The eddy loop loss is very high when $R_T$ is approximately half of $\omega L_{200\ k}$. At this middle impedance point, the eddy current is not completely blocked while the real part of $Z_T$, which dissipates power, is large. Hence, the filter impedance should not be near $\omega L_{200\ k}$. At high impedance, the eddy current is heavily suppressed and, therefore, both the Tx losses and eddy loop losses are minimized.

Figure 10:
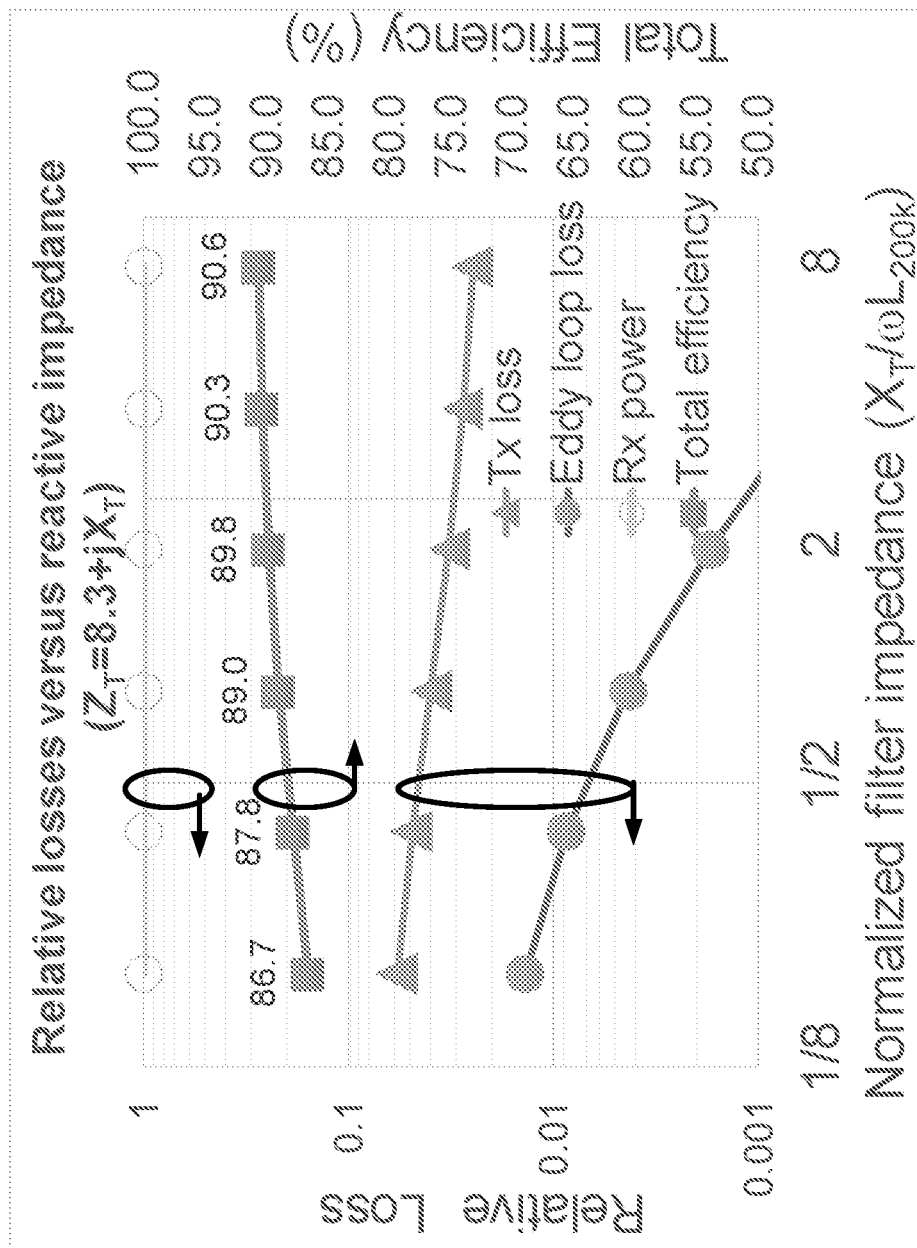
FIG. 10 plots calculated losses if the impedance $Z_T$ consists of mainly inductance.

FIG. 10 shows calculated losses if the impedance $Z_T$ consists of mainly inductance. With 10 μH $L_F$, the $X_T/\omega L_{200\ k}$ value of only 0.47 is obtained. The eddy current is not completely suppressed and Tx loss is high. It is difficult to obtain the desired high impedance if $C_F$ is not used. For example, the measured impedances of the 11.2 μH $L_F$ with and without $C_F$ are 22538+j25412Ω and 4.4+j477Ω, respectively. The normalized impedance of j477Ω with respect to $\omega L_{200\ k}$ is only 0.47. FIG. 10 illustrates the calculated losses when the impedance $Z_T$ mainly consists of inductance $L_F$ and an 8.3Ω parasitic resistance from $L_{200\ k}$. At higher filter impedances, the eddy loop losses can be lowered and the total efficiency can be higher than the case of FIG. 9. However, it is not practical to implement such a high impedance by only using $L_F$ because high $L_F$ degrades efficiency in the 200 kHz mode, increasing the system volume and voltage stress across $C_{200\ k}$. When the normalized impedance of the pure inductor is 0.47 as in this case, the eddy current is not sufficiently blocked and the Tx coil loss is twice that of FIG. 9. In summary, the 6.78 MHz operation benefits greatly from an eddy current blocking filter in the 200 kHz output network to minimize losses, and the FIG. 1A filter $L_F$-$C_F$ can provide the requisite high impedance for efficient operation.

200 kHz Operation Mode

Figure 11:
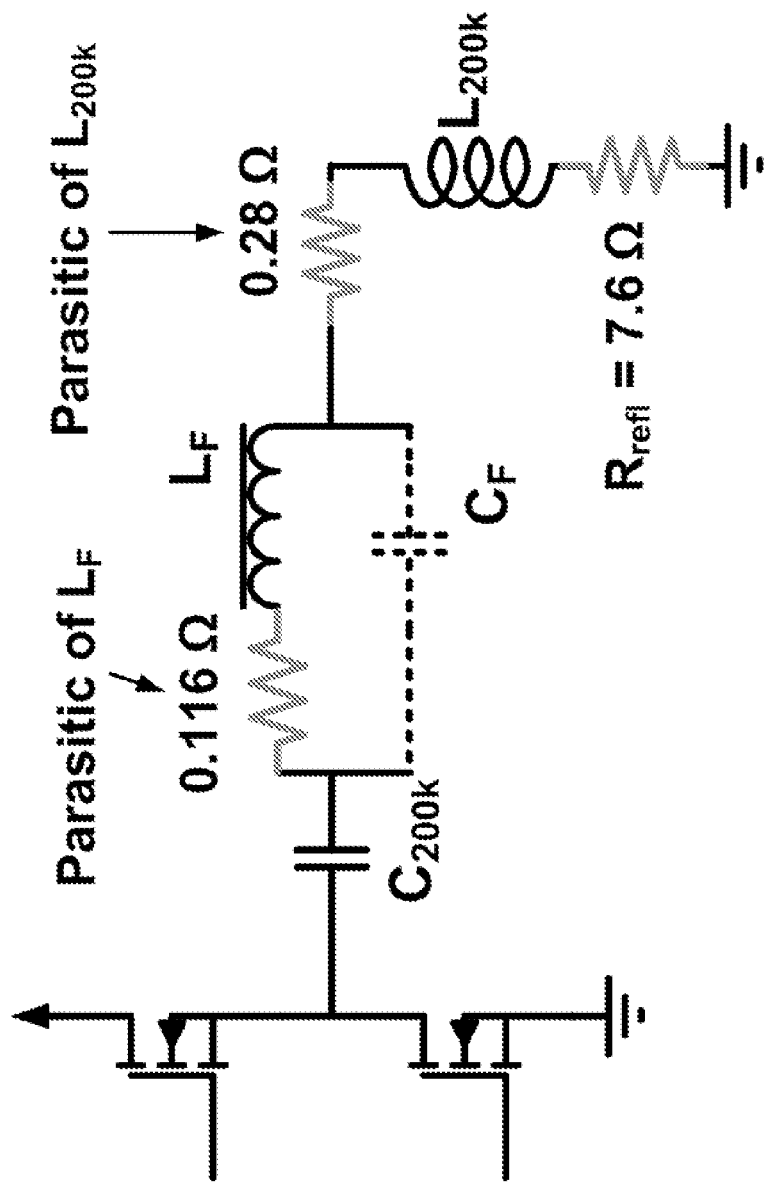
FIG. 11 is an equivalent model FIG. 1A transmitter circuit at 200 kHz operation.

FIG. 11 shows is the equivalent FIG. 1A transmitter circuit model at 200 kHz operation. The parasitic resistance of $L_F$ does not significantly degrade the 200 kHz mode efficiency because reflected resistance is larger When the 200 kHz power carrier flows through $L_{200\ k}$, eddy currents flow through the $L_{6.78\ M}$-$C_{6.78\ M}$-$C_{6.78\ M2}$ path. However, this eddy current is small because $C_{6.78\ M}$, which is inherently needed to provide resonant operation and output matching, behaves as a high-impedance filter at 200 kHz. Moreover, the inductance of $L_{6.78\ M}$ is also small. Following the similar procedure as outlined by Eqns. (4)-(7), and knowing that $Z_T = 1/(j\omega' C_{6.78\ M}) = -j795\Omega \gg \omega'^* L_{6.78\ M} = 1.5\Omega$, where $\omega'$ is $2\pi \times 200$ kHz, the 6.78 MHz path is seen as a nearly open-circuit network by the 200 kHz power carrier signal. Therefore, we determined that no additional filter beyond the inherent 6.78 MHz resonant tuning is not necessary for the 200 kHz operation mode.

Although the $L_F$-$C_F$ filter appears in series with the load and thus should slightly increase losses, in practice the additional losses are not significant. With reference to the FIG. 11 model, at low frequencies, the impedance of $C_F$ is very high and almost all current flows through $L_F$, which contributes a small parasitic resistance at 200 kHz. The measured inductance and parasitic resistance of $L_F$ are 9.6 μH and 0.116Ω at 200 kHz, respectively. The 0.116Ω parasitic resistance degrades the efficiency in the 200 kHz mode only by 1.3% since the reflected resistance from the receiver to $L_{200\ k}$ is 7.6Ω and the series loss of $L_{200\ k}$ is 0.28Ω. The measured total system efficiency of 200 kHz mode with and without the $L_F$-$C_F$ filter are 70.2% and 71.5%, respectively.

Transmitter Coil 16 and 18 Configurations

Figures 12A, 12B:
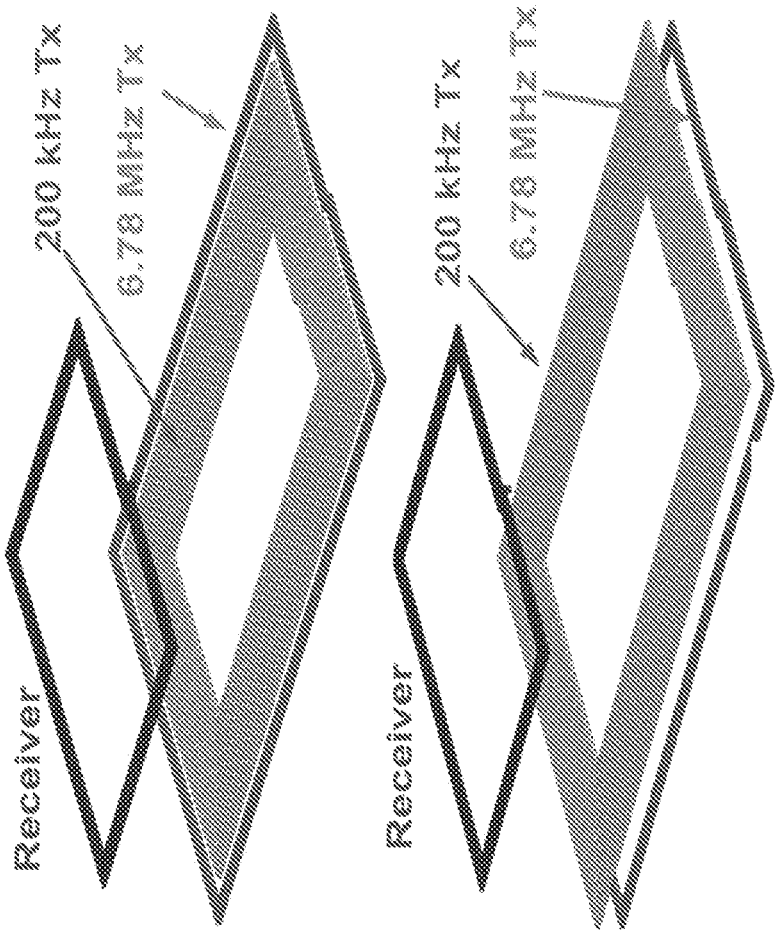
FIGS. 12A and 12B illustrate respective coplanar and stacked adjacent configurations for the transmitter coils of FIG. 1A.

These two Tx coils can be arranged in two different manners as shown in FIGS. 12A and 12B, namely coplanar or stacked adjacent. The placement selection provides a trade-off between optimal 6.78 MHz efficiency, 200 kHz efficiency, and physical device size. Table I compares the different Tx structures.

TABLE I

COMPARISON OF COPLANAR AND STACKED TXS

| | | 6.78 MHz mode parameters | | | | | 200 kHz mode parameters | |
|---|---|---|---|---|---|---|---|---|
| | | | | Eddy loss per unit | Tx loss per unit | | | |
| Tx configurations | $k_{TX}$ | $k_1$ | $k_2$ | Rx power | Rx power | Efficiency | $k_2$ | Efficiency |
| Coplanar, 6.78 MHz outer | 0.47 | 0.12 | 0.129 | 0.047 | 0.019 | 87.1% | 0.129 | 79.2% |
| Coplanar, 6.78 MHz inner | 0.39 | 0.071 | 0.142 | 0.068 | 0.043 | 83.6% | 0.142 | 80.7% |

TABLE I-continued

COMPARISON OF COPLANAR AND STACKED TXS

| | | 6.78 MHz mode parameters | | | | | 200 kHz mode parameters | |
|---|---|---|---|---|---|---|---|---|
| Tx configurations | $k_{TX}$ | $k_1$ | $k_2$ | Eddy loss per unit Rx power | Tx loss per unit Rx power | Efficiency | $k_2$ | Efficiency |
| Vertically-stacked, 2 mm separation | 0.65 | 0.111 | 0.142 | 0.073 | 0.017 | 85.2% | 0.142 | 80.7% |
| Vertically-stacked, 5 mm separation | 0.54 | 0.099 | 0.142 | 0.068 | 0.022 | 85.2% | 0.142 | 80.7% |

The 200 kHz Tx coil can be best coupled to its receiver if the 200 kHz Tx coil is stacked adjacent the 6.78 MHz coil. However, this lowers the efficiency at 6.78 MHz since this increases the coupling between the two Tx coils, $k_{TX}$, exacerbating eddy current losses. Moreover, the 6.78 MHz coil cannot be tightly coupled to its receiver because the distance between the 6.78 MHz Tx and Rx is now increased. The vertical thickness of the overall Tx device becomes bulkier. On the other hand, the 6.78 MHz mode performs best if its Tx coil is placed outside of the 200 kHz Tx coil in a single plane. Here, the eddy current loss is minimized and the Tx-to-Rx coupling is maximal. However, the efficiency at 200 kHz is sacrificed due to the limited outer diameter of the 200 kHz Tx coil. In fact, the outer radius of the 200 kHz Tx coil is 6 mm smaller than that of the 6.78 MHz coil in this case. As a result, the efficiency at 200 kHz is degraded by 1.5% as shown in Table I, and the allowed lateral misalignment (lateral position offset) range of the 200 kHz mode is slightly narrower (by 6 mm).

The coplanar configuration can also be built in two different ways: inner 200 kHz-outer 6.78 MHz coils, or inner 6.78 MHz-outer 200 kHz coils. The former case is preferred, as the sacrificed outer radius of the 200 kHz coil is only 6 mm since the 6.78 MHz coil has a lower number of turns. Instead of a 6 mm sacrifice, placing the 6.78 MHz coil inside the 200 kHz coil would sacrifice the outer radius of the 6.78 MHz coil by 20 mm, which is not preferred due to low efficiency as shown in Table I, and would further make the coupling between 6.78 MHz Tx and Rx more sensitive to lateral misalignment and vertical separation.

Based on this analysis, the fabricated Tx coils, particularly preferred embodiments consistent with FIG. 1A employ a coplanar design with the 200 kHz coil packed within the 6.78 MHz coil, which is represented in FIG. 1. This enables the thinnest possible design, and as an added benefit, the current rating of the $L_F$ filter inductor can be relaxed since the eddy current is the lowest in this configuration.

$L_F$-$C_F$ Value Selection

Figure 13:
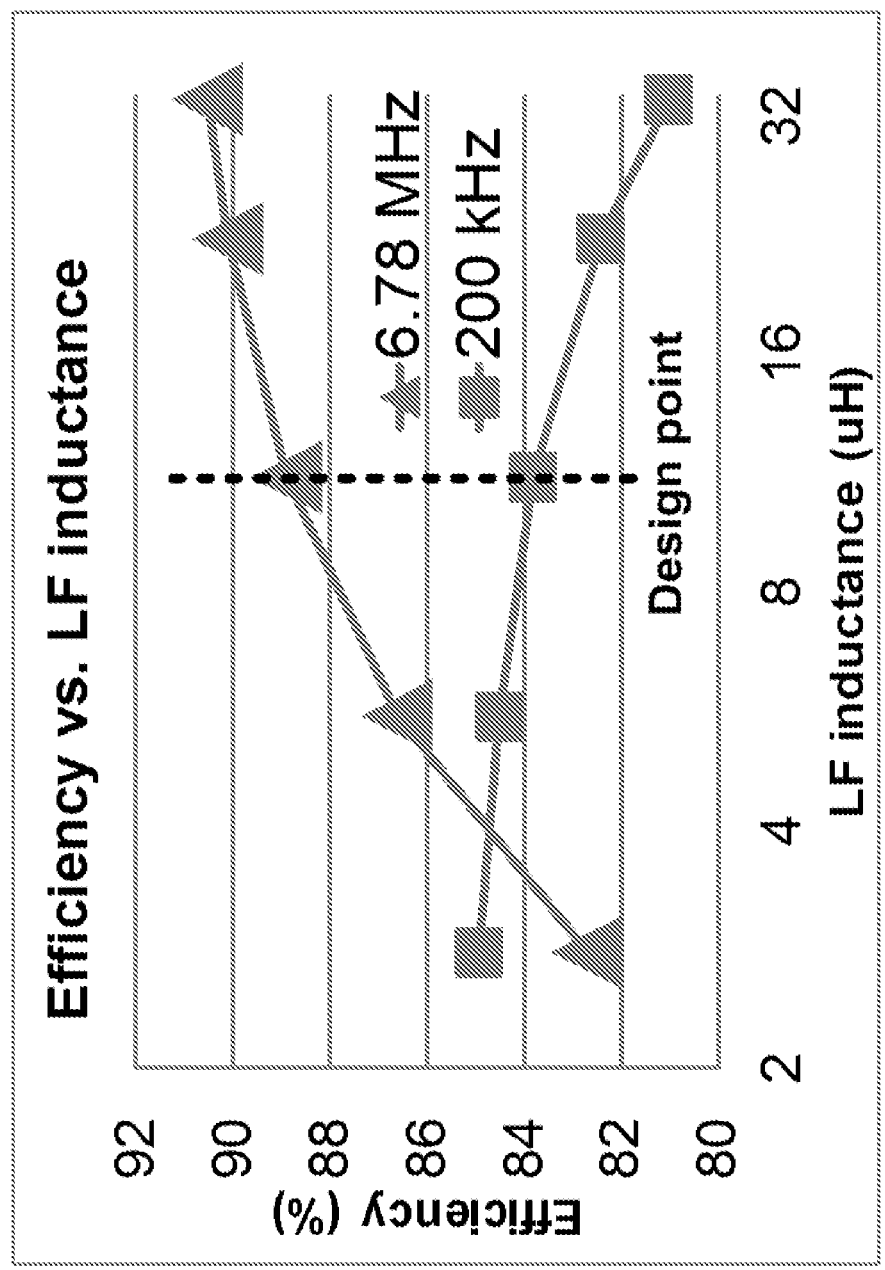
FIG. 13 plots simulated efficiency versus $L_F$ filter inductance.

The equivalent impedance of the $L_F$-$C_F$ resonant tank at $\omega_0 = 1/\sqrt{L_F C_F} = 2\pi \times 6.78$ MHz can be found by looking at the input impedance of the parallel resonant LC tank, as given in Eqn. (12):

$$Z_F = (\omega_0 L_F)^2 / R_P - j1/(\omega_0 C_F) \quad (12)$$

where $R_P$ is the parasitic resistance of $L_F$. While a larger $L_F$ can achieve a higher impedance for superior performance in the 6.78 MHz mode, such a choice would degrade efficiency at 200 kHz because the large inductance also increases the parasitic resistance in series with the 200 kHz Tx coil as shown in FIG. 11. The simulated efficiencies in FIG. 13 show this trade-off. Specifically, the selection of $L_F$ value is a trade-off between 6.78 MHz and 200 kHz. The capacitor is selected such that resonance occurs with selected inductor value. In the experimental device consistent with FIGS. 1A and 1B, the selected value of $L_F$ and $C_F$ is 11.2 μH and 47 pF, respectively. A toroid carbonyl core with a 3.3 cm outer diameter is used to wind $L_F$. The AC flux density inside the core is estimated as 26.6 Gauss, which is ten times lower than the allowed limit. The measured impedance at 6.78 MHz is 25900+j23900Ω. As desired, the magnitude of this impedance is 35 times higher than $\omega L_{200\,k}$ at 6.78 MHz.

Experimental Power Converter

Details are provided as an example and so that artisans can understand the data reported, and not to limit the broader invention. The 6.78 MHz path employs a current-switching Class-D inverter for the coil driver. This topology achieves a higher efficiency at high frequency since the output parasitic capacitances of the MOSFETs can be absorbed by $C_{6.78\,M2}$. FDMC86106LZ MOSFET transistors are used due to their low parasitic capacitance and on-resistance. The input voltage to 6.78 MHz inverter is 12 V at full load. The 6.78 MHz receiver employs PMEG2015EA rectification diodes also for their low parasitic capacitance. On the other hand, the 200 kHz path employs a zero-current switching (ZCS) half-bridge inverter with FDD3860 MOSFETs chosen due to their low on-resistance. The input to the 200 kHz inverter is 21 V at full load. The 200 kHz receiver uses MBRA320T3G rectification diodes.

Figure 14:
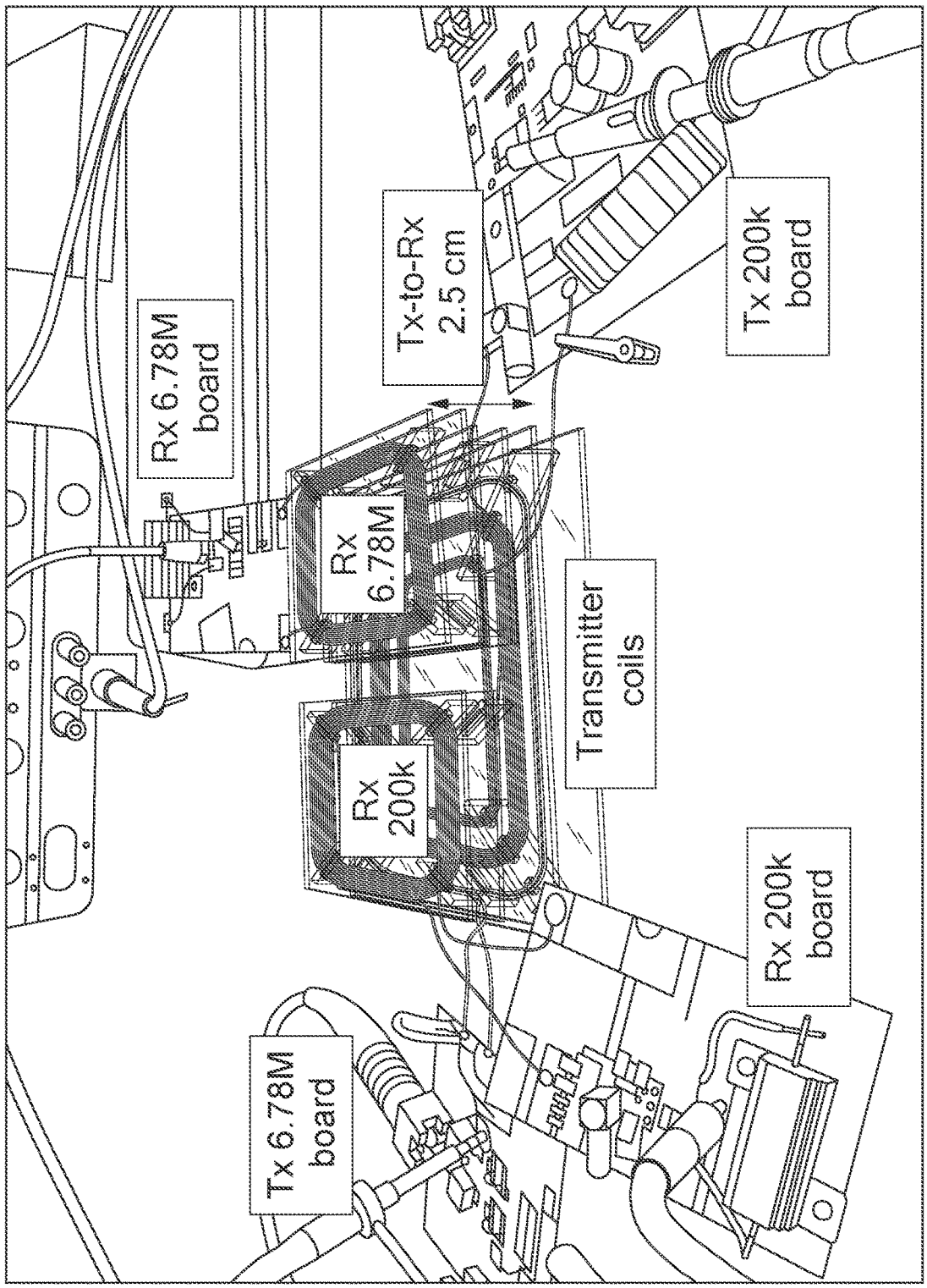
FIG. 14 is an image of an experimental measurement set-up.

The measurement setup is shown in FIG. 14. For initial prototyping purposes the coils are wound around Plexiglas fixtures, which also serve to support the coils. In this setup the distance between the Tx and Rx coils are 2.5 cm. The developed setup resembles a wireless charging pad for cellular phones, in which the Tx coil is embedded within a Tx charging pad and the receivers are placed on top of the charging pad. Charging pads are typically larger than receivers to accommodate multiple receivers as described in each specification document for the applicable standards [A4WP Wireless power transfer system baseline system specification (BSS) A4WP-S-0001 v1.2, January 2014], [System description wireless power transfer volume 1: Low power, Wireless Power Consortium Specification, June 2013]. The advantage of the present Tx is that any two receivers of different frequency standards can be simultaneously charged by a single piece of Tx hardware with minimal efficiency degradation when supporting multi-band operation.

The Tx boards are powered by bench-top DC power supply, while the Rx boards have full-bridge rectifiers and power load resistors which can withstand up to 25 W. The voltage across the dc load resistors are recorded to measure the power delivered to load. Table II summarizes the system parameters.

TABLE II

SYSTEM PARAMETERS

| | 6.78 MHz | 200 kHz |
|---|---|---|
| $L_F$ | 11.2 μH + 4.44 Ω | 9.6 μH + 0.116 Ω |
| $C_F$ | | 47 pF |
| $C_{para}$ | | 9.5 pF |
| $C_{shunt}$ | | 330 pF |
| $C_{200k}$ | | 19 nF |
| $L_{200k}$ | 23.9 μH + 8.3 Ω | 23.9 μH + 0.28 Ω |
| $L_{6.78M}$ | 1.2 μH + 0.323 Ω | |
| $L_{RX200}$ | | 28.3 μH + 0.614 Ω |
| $L_{RX6.78}$ | 4.4 μH + 0.958 Ω | |
| $C_{6.78M}$ | | 2 nF |
| $C_{6.78M2}$ | | 440 pF |
| $k_1$ 6.78M system | 0.144 | |
| $k_2$ 6.78M system | 0.144 | |
| $k_1$, 200k system | | 0.182 |
| $k_2$, 200k system | | 0.182 |
| $k_{TX}$ | 0.44 | |
| Load | 10.5 V, max 0.8 A | 6 V, max 1.2 A |

The measured transient waveforms of the Tx inverters and Rx loads of FIGS. 2A and 2B were obtained during a concurrent power delivery experiment. It can be seen that the measured interference from the 200 kHz channel to the 6.78 MHz load or vice versa is very small during concurrent operation. To verify that minimal cross-talk occurs, it was observed that the 200 kHz load voltage is zero when only the 6.78 MHz Tx is operating and vice versa.

The calculated, simulated, and measured efficiencies across varying loads were given in FIGS. 3A and 3B. The end-to-end efficiency of the system can be computed by multiplying the efficiencies of the Tx inverter, Tx-to-Rx coil power transfer, and the rectifier. To compute and simulate the Tx-to-Rx coil efficiency, the coils are first modeled as RLC circuits using parameters extracted from measurement, and the coupling coefficients between coils are extracted by the method presented in [M. Ghovanloo, and S. Atluri, "A wide-band power-efficient inductive wireless link for implantable microelectronic devices using multiple carriers," *IEEE Trans. Circuits. Syst.*, vol. 54, no. 10, pp. 2211-2221, October 2007]. Equation (9) is then used to calculate the efficiency. The efficiencies of the Tx inverter and rectifier are difficult to simulate due to the lack of spice model of the discrete components. Instead, inverter efficiencies are directly measured, which are 92.9% and 91.5% for the 6.78 MHz and 200 kHz inverter, respectively. The rectifier efficiency is estimated by dividing the output load voltage by the sum of forward voltage drop and output load voltage. In this manner, the 6.78 MHz and 200 kHz rectifier efficiencies are found to be 91.7% and 89.6%, respectively. It can be seen in FIGS. 3A and 3B that the measured efficiency matches well with the simulated/calculated values.

FIG. 3A specifically shows the end-to-end efficiency at 6.78 MHz operating in several different modes. The "standalone" 6.78 MHz mode is measured by disconnecting the 200 kHz Tx board from the 200 kHz Tx coil. The "concurrent" 6.78 MHz mode is measured when the 200 kHz is simultaneously operating with $L_F$-$C_F$ filter. At full load, the efficiency of the 6.78 MHz path in standalone mode and concurrent mode is 81.8% and 78.8%, respectively. The efficiency drops due to simultaneous operation with the 200 kHz standard are 3% and 4.2% at full and light load, respectively. In the "no filter" mode, the 6.78 MHz path is tested with the 200 kHz Tx board connected, but the $L_F$-$C_F$ filter is removed and the two remaining terminals are shorted by a wire. The resultant eddy current changes the effective inductance and resonant frequency of the 6.78 MHz Tx, and therefore the resonant capacitors are adjusted to bring the resonant frequency back to 6.78 MHz. The measured efficiency in this mode is 70.4%, which is 8.4% lower than the concurrent mode with the $L_F$-$C_F$ filter.

Measured results of the 200 kHz path over the different operating modes were given in FIG. 3B. The "standalone" 200 kHz setup is measured by disconnecting the 6.78 MHz board, removing the $L_F$-$C_F$ filter, and re-tuning $C_{200\ k}$. The "concurrent" 200 kHz setup is measured when the 6.78 MHz is simultaneously operating and the $L_F$-$C_F$ filter is connected. It can be seen that the efficiency of the 200 kHz mode is almost the same with or without the $L_F$-$C_F$ filter. The efficiency differences between "standalone" and "concurrent" are 1.3% and 4% at full and light load, respectively. The concurrent setup without the $L_F$-$C_F$ filter is also tested, but the efficiency is not plotted since it was measured to be the same as the "standalone" mode.

The presented measurement results are summarized in Table III for the 6.78 MHz path by describing the required Tx coil current and resulting efficiency in the standalone mode, as well as the concurrent modes with and without the $L_F$-$C_F$ filter. The Tx coil currents of the three configurations are set to deliver the same amount of power to the receiver. It can be seen that Tx current is at least 2× larger when the eddy currents are not blocked, which matches predictions when comparing (5) and (7) with $k_{TX}$=0.44. We determined that eddy current blocking is very important to improve the efficiency and reduce the driving current requirement of a dual-mode wireless power transmitter consistent with FIG. 1A.

TABLE III

REQUIRED TX COIL CURRENT FOR 8.8 W RECEIVED POWER OPERATING AT 6.78 MHz

| | Efficiency (%) | Tx coil current RMS (A) |
|---|---|---|
| Standalone mode | 81.8 | 0.8 |
| Concurrent with LC filter | 78.8 | 0.75 |
| Concurrent without LC filter | 70.4 | 1.63 |

Figure 15:
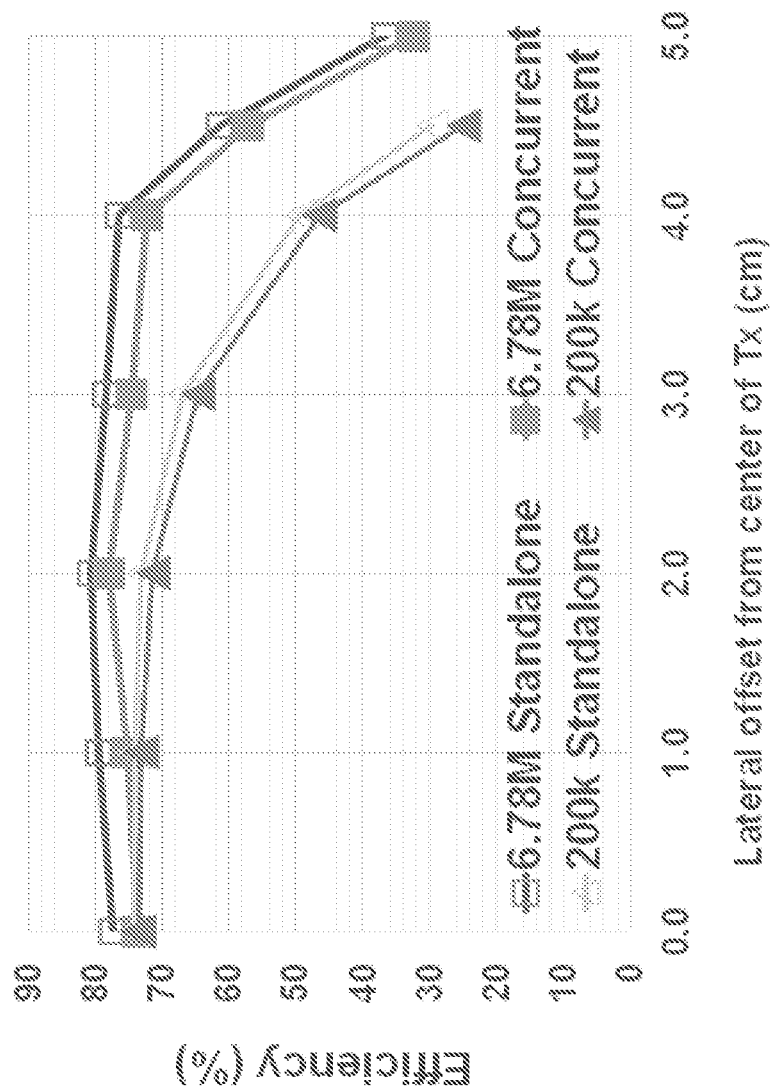
FIG. 15 plots measured efficiencies versus receiver misalignment from Tx center.

The experimental system was also tested for operation versus lateral misalignment. FIG. 15 illustrates shows efficiencies versus transmitter lateral misalignment. It can be seen that concurrent operation does not significantly affect the efficiency versus lateral misalignment. We observe that the 6.78 MHz path can accommodate a wider lateral misalignment since the 6.78 MHz Tx coil has a larger diameter than the 200 kHz Tx coil. Table IV summarizes the performance of the experimental system in accordance with FIGS. 1A and 1B in comparison to prior art. The present design achieves high efficiency with concurrent delivery of power to two receivers operating at different standards-compliant frequencies.

TABLE IV

PERFORMANCE COMPARISON

| | Frequency mode | Standard | Power (W) | Efficiency (%) | Distance (mm) | Multiband capability | Multiband support location |
|---|---|---|---|---|---|---|---|
| This work | 6.78 MHz | A4WP | 9.0 | 78 | 25 | Yes | Tx side |
| | 200 kHz | WPC/PMA | 7.4 | 70.6 | | | |
| [3] | 6.78 MHz | A4WP | 5 | 48~58 | n/a | Yes | Rx side |
| | 144 kHz | WPC/PMA | 5 | 72 | | | |
| [2] | 140 kHz | WPC/PMA | 5 | 70 | 5 | No | n/a |
| [15] | 13.56 MHz | n/a | n/a | 80† | 50 | Yes | Tx and/or Rx |
| | 6.78 MHz | A4WP | n/a | 80† | | | |

†Coil-to-coil efficiency only

Parasitics of the 200 kHz Receiver

The parasitics of the 200 kHz Rx can also behave as an additional eddy current loop for the 6.78 MHz signal. Fortunately, this eddy current does not contribute significant losses, since the coupling coefficient between the 6.78 MHz Tx and the 200 kHz Rx in this instance (0.182) is weaker than the coupling coefficient between the 6.78 MHz Tx and the 200 kHz Tx (0.44). More importantly, the coupling coefficient between the 200 kHz Rx and the 6.78 MHz Rx is very weak (simulation predicts the coupling of 0.06), implying that the magnetic field cancellation at 6.78 MHz Rx due to the 200 kHz Rx eddy current is minimal.

Figure 16:
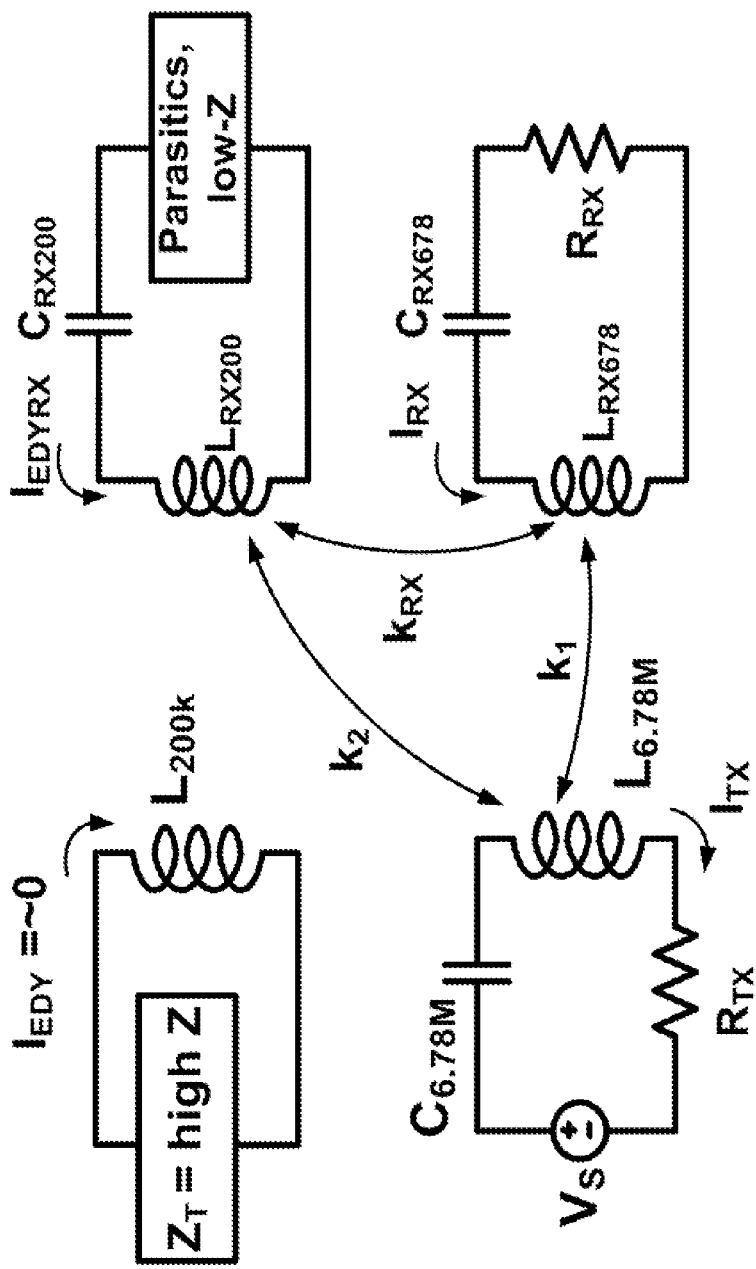
FIG. 16 is a circuit model for parasitics of the 200 kHz transmitter.

FIG. 16 illustrates the effect of the 200 kHz Rx on the 6.78 MHz operation. The 200 kHz Rx behaves as a weak eddy current loop; however, its impact is minimal due to weak $k_2$ and $k_{RX}$.

FIG. 16 can be used to analyze these cross-coupling effects. The analysis is similar to analysis of the FIG. 7 model and its subsequent equations except the changes of notation. The 200 kHz Tx, $L_{200\,k}$, is now equipped with eddy blocking $L_F$-$C_F$ filter and therefore decoupled from system. Since the 200 kHz Rx is not equipped with an $L_F$-$C_F$ filter, the required Tx driving current can be evaluated using equation (5), which states that Tx driving current is increased by a factor of $1/(1-(k_{RX}/k_1)k_2)$ with changes in notation. Using numerical values representative of the geometries involved in this work, the Tx driving current is increased by only 8%. As a result, the impact of the 200 kHz receiver on the 6.78 MHz Tx is small. Measurement results during 6.78 MHz operation also indicate that the efficiency with and without the presence of the 200 kHz Rx is nearly the same: efficiency decreases from 78.9% to 78.8%, a degradation of only 0.1%.

EXPERIMENTAL CONCLUSIONS

The experimental embodiments demonstrated a dual-frequency wireless power transfer transmitter module that can simultaneously power two receivers operating at either 200 kHz, which is in the range of the WPC/PMA standards, or 6.78 MHz, which is supported by the A4WP standard. Achieving dual-band support, especially when the desired frequencies are an order of magnitude apart, requires careful consideration of parasitics, coil design, and eddy current paths. In particular, the lower frequency path should include impedance that is at least four times higher for the higher frequency than experienced by the lower frequency.

The preferred experimental embodiment in accordance with FIGS. 1A and 1B provided a practical two-coil, dual-band power transmitting device that enables concurrent operation. Analytical expressions predicting the eddy current losses associated with the two-coil system are provided in this application will enable artisans to apply the general principles of the invention beyond the specific example design and frequencies. The filter design parameters that minimizes such losses can be extended to other wireless power transmitting devices with different frequency bands. The experimental prototype showed that consequence of enabling dual-band support is reduced efficiency compared to a design optimized for a single-band only. However, the experimental prototype minimized this degradation to be between 1.3% and 4.2% under various conditions. Although there are two coils, the overall coil size does not increase since the two coils are placed within each other on the same plane or in a stacked adjacent arrangement. The FIG. 1A with filter allows each Tx coil to be optimized for its target frequency, enabling high end-to-end efficiency even during simultaneous dual-band operation.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A wireless power transmitting device, comprising:
two coils respectively configured for transmission field at two separate and unique wireless power transmission frequency bands wherein a lower frequency one of the two coils is coplanar and contained within a geometry of a higher frequency one of the two coils and the lower frequency one of the two coils includes reduced sacrificed outer radius and the two coils are embedded within a transmission charging pad;
a dedicated current or voltage driver for each of said two coils, wherein the dedicated current or voltage driver for the high frequency one of the two coils comprises a current-switching Class-D inverter and a capacitor to absorb parasitic capacitances of transistors in the Class-D inverter and the dedicated current or voltage driver for the lower frequency one of the two coils comprises a zero-current switching half-bridge inverter;
a controller to cause said current or voltage drivers to selectively or concurrently generate an AC magnetic field at either or both of the two separate and unique wireless power transmission frequency bands; and a filter in the form of an auxiliary resonant tank in series with the dedicated auxiliary resonant tank is tuned to a resonant frequency of the higher frequency one of the two coils.

2. The device of claim 1, wherein the two separated separate and unique wireless power transmission frequency bands comprise 6.78 MHz±30 kHz and 30~400 kHz frequency bands and the auxiliary resonant tank inhibits 6.78 MHz±30 kHz eddy current from flowing in one of the two coils configured to the 30~400 kHz frequency band.

3. The device of claim 1, further comprising one or both of shunting and blocking filters to reduce coupled losses for each of the two coils.

4. The device of claim 1, wherein the auxiliary tank filter comprises an impedance $Z_T$ that is high compared to $\omega L_{200}$ to inhibit eddy currents at the higher one (w) of the two separate and unique wireless power transmission frequency bands.

5. The device of claim 1, wherein the two separate and unique wireless power transmission frequency bands comprise the A4WP standard and one or more of the WPC and PMA standards.

6. The device of claim 1, wherein the two separate and unique wireless power transmission frequency bands are separated by 5× or more.

7. The device of claim 6, wherein the two separate and unique wireless power transmission frequency bands are separated by 10× or more.

* * * * *